US012633948B1

(12) United States Patent
Rofougaran et al.

(10) Patent No.: US 12,633,948 B1
(45) Date of Patent: May 19, 2026

(54) WIRELESS COMMUNICATION DEVICE AND METHOD FOR WIDEBAND SPECTRUM MONITORING

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Beach, CA (US); Milan Rofougaran, Newport Coast, CA (US); Kavian Odabaee, Newport Coast, CA (US)

(73) Assignee: Peltbeam Inc., Sherman Oaks, CA (US)

( * ) Notice: Subject to any disclaimer, the term of this patent is extended or adjusted under 35 U.S.C. 154(b) by 0 days.

(21) Appl. No.: 19/329,699

(22) Filed: Sep. 16, 2025

(51) Int. Cl.
*H04B 1/40* (2015.01)
*H04B 1/00* (2006.01)

(52) U.S. Cl.
CPC ......... *H04B 1/0078* (2013.01); *H04B 1/0096* (2013.01); *H04B 1/40* (2013.01)

(58) Field of Classification Search
CPC ...... H04B 1/0078; H04B 1/40; H04B 1/0096; H04B 1/04; H04B 1/005
See application file for complete search history.

(56) References Cited

U.S. PATENT DOCUMENTS

| | | | |
|---|---|---|---|
| 8,805,291 B1 | 8/2014 | Garcia et al. | |
| 8,958,764 B1 | 2/2015 | Xu et al. | |
| 10,498,371 B1 * | 12/2019 | Parikh | .................... H03D 7/161 |

(Continued)

FOREIGN PATENT DOCUMENTS

| | | |
|---|---|---|
| CA | 3027586 A1 | 6/2019 |

OTHER PUBLICATIONS

Notice of Allowance of related U.S. Appl. No. 19/333,433 mailed Dec. 31, 2025.

(Continued)

*Primary Examiner* — Jinsong Hu
*Assistant Examiner* — Farideh Madani
(74) *Attorney, Agent, or Firm* — CHIP LAW GROUP

(57) ABSTRACT

A wireless communication device includes RF input to receive RF signals in a range of DC to 300 GHz. The wireless communication device includes RF front-end that includes plurality of band filters to apply band-specific filtering operation to the received RF signals to obtain filtered RF signals. A local oscillator generates tunable local oscillator frequencies above a threshold frequency. The wireless communication device includes circuitry to execute a frequency shifting operation in one or more frequency conversion stages in which one or more tuned local oscillator frequencies above the threshold frequency are injected at the circuitry to push image frequencies above the threshold frequency and shift the filtered RF signals to predefined intermediate frequencies. The filtered RF signals are digitized and a processor concurrently processes the digitized down-converted signals across predefined intermediate frequencies, based on configuration of MLO parameters and performs a real-time or near real-time enhanced spectrum monitoring operations.

20 Claims, 6 Drawing Sheets

(56) References Cited

U.S. PATENT DOCUMENTS

| | | | |
|---|---|---|---|
| 2013/0043946 A1* | 2/2013 | Hadjichristos | H03F 1/223 |
| | | | 330/252 |
| 2025/0351175 A1* | 11/2025 | Mehrnoush | H04W 76/15 |

OTHER PUBLICATIONS

Notice of Allowance of U.S. Appl. No. 19/333,433, dated Feb. 24, 2026.

* cited by examiner

400

Receive RF signals across a plurality of frequency bands in a range of DC to 300 GHz
402

Apply band-specific filtering operation to the received RF signals across the plurality of frequency bands to obtain filtered RF signals 404

Process, via first band filter, the received RF signals in a first frequency range 404A

Process, via second band filter, the received RF signals in a second frequency range, where the second frequency range is higher than the first frequency range 404B

Process, via third band filter, the received RF signals in a third frequency rang, where the third frequency range is higher than the second frequency range 404C

Determine input RF signal frequency of the received RF signals from among the plurality of frequency bands 406

Generate tunable local oscillator frequencies above a threshold frequency 408

Generate, via local oscillator generator, a specific local oscillator frequency that is higher than the determined input RF signal frequency by a defined offset 408A

Execute frequency shifting operation in one or more frequency conversion stages in which one or more tuned local oscillator frequencies above the threshold frequency are injected at the circuitry to push image frequencies above the threshold frequency and shift the filtered RF signals to predefined intermediate frequencies 410

Convert the filtered RF signals at the predefined intermediate frequencies in digital form to obtain digitized down-converted signals 412

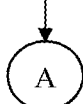

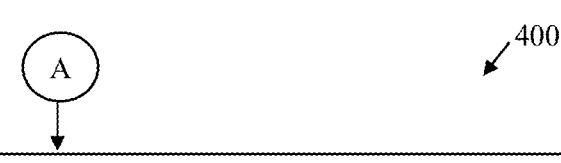

Demultiplex the filtered RF signals at the predefined intermediate frequencies into a plurality of different WLAN frequency channels 414

Assign a distinct signal processing path to each of the plurality of different WLAN frequency channels 416

Concurrently process the digitized down-converted signals in a first intermediate frequency band and a second intermediate frequency band corresponding to the predefined intermediate frequencies, based on configuration of MLO parameters in the wireless communication device
418

Perform a cross-band correlation between the processed digitized down-converted signals from the first intermediate frequency band and the second intermediate frequency band to identify related signal patterns 420

Execute a sliding window Fast Fourier Transform (FFT) operation on the digitized down-converted signals from each of the first intermediate frequency band and the second intermediate frequency band 420A

Maintain a continuous FFT buffer for each of the first intermediate frequency band and the second intermediate frequency band 420B

Compute cross-correlation coefficients between FFT outputs of the first intermediate frequency band and the second intermediate frequency band to detect temporal signal patterns 420C

Perform a real-time or near real-time spectrum monitoring based on the processed digitized down-converted signals 422

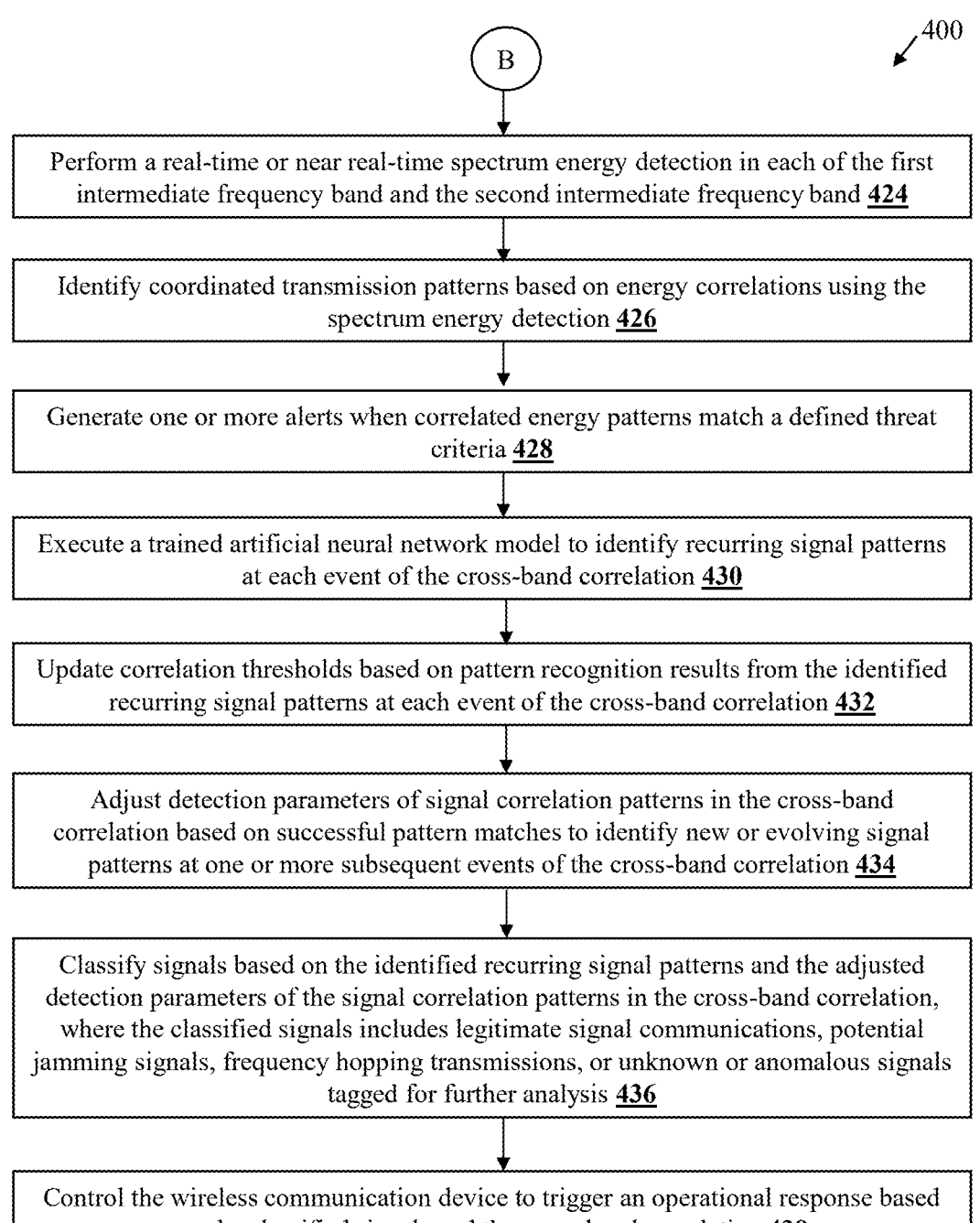

B

Perform a real-time or near real-time spectrum energy detection in each of the first intermediate frequency band and the second intermediate frequency band 424

Identify coordinated transmission patterns based on energy correlations using the spectrum energy detection 426

Generate one or more alerts when correlated energy patterns match a defined threat criteria 428

Execute a trained artificial neural network model to identify recurring signal patterns at each event of the cross-band correlation 430

Update correlation thresholds based on pattern recognition results from the identified recurring signal patterns at each event of the cross-band correlation 432

Adjust detection parameters of signal correlation patterns in the cross-band correlation based on successful pattern matches to identify new or evolving signal patterns at one or more subsequent events of the cross-band correlation 434

Classify signals based on the identified recurring signal patterns and the adjusted detection parameters of the signal correlation patterns in the cross-band correlation, where the classified signals includes legitimate signal communications, potential jamming signals, frequency hopping transmissions, or unknown or anomalous signals tagged for further analysis 436

Control the wireless communication device to trigger an operational response based on the classified signals and the cross-band correlation 438

FIG. 4C

WIRELESS COMMUNICATION DEVICE AND METHOD FOR WIDEBAND SPECTRUM MONITORING

CROSS-REFERENCE TO RELATED APPLICATIONS/INCORPORATION BY REFERENCE

None.

FIELD OF TECHNOLOGY

Certain embodiments of the disclosure relate to wireless communication devices and spectrum monitoring systems. More specifically, certain embodiments of the disclosure relate to a wireless communication device and a method for wideband spectrum monitoring (e.g., enhanced spectrum monitoring from direct current (DC, i.e. 0 hertz) to 300 gigahertz).

BACKGROUND

The rapid growth of wireless communication technologies and the increasing demand for high-bandwidth applications have led to significant challenges in the current spectrum management landscape. It is known that radio monitoring is the basis of spectrum management. Spectrum monitoring helps spectrum regulators to plan and use frequencies, avoid incompatible usage, and identify sources of harmful interference. It is a growing problem due to the growing number of spectrum uses. Equipment such as spectrum analyzers are useful tools for analyzing and monitoring radio frequency (RF) signals. These instruments are useful for wireless communications testing, ensuring regulatory compliance, and troubleshooting RF interference. Spectrum analyzers play vital roles in RF design, testing, and electronic circuit development. Conventional spectrum analyzers, while effective to a certain extent, face several limitations. Currently, there are many technical challenges in effective spectrum monitoring and signal analysis across multiple frequency bands in increasingly congested electromagnetic environments. For example, high-end analyzers capable of monitoring frequencies up to 80+ GHz can cost between \$1-2 million per unit, with even lower frequency models (4-5 GHz) ranging from \$15,000-50,000. This significant cost barrier prevents widespread deployment of spectrum monitoring systems, particularly in applications requiring multiple monitoring points.

Current spectrum analysis solutions generally fall into two categories: swept and real-time analyzers. Swept analyzers operate by sequentially scanning frequency ranges, introducing deadtime between sweeps that can miss intermittent signals. Real-time analyzers offer faster acquisition but require complex and expensive hardware for simultaneous Fast Fourier Transform (FFT) processing. Both approaches typically demand dedicated hardware for different frequency bands, further increasing system complexity and cost. These limitations become particularly problematic in modern wireless environments characterized by, for example: (a) increasing spectrum congestion from proliferating wireless devices; (b) growing deployment of autonomous systems requiring reliable communication; (c) need for reliable interference detection and mitigation; (d) requirements for spatial awareness and signal source location; and (e) complex signal environments requiring advanced pattern recognition. With conventional systems, while traditional software-defined radio (SDR) solutions offer more flexibility, they often have restricted frequency spans and insufficient processing capability for advanced signal analysis. Additionally, conventional analyzers struggle with limited spatial awareness, making it difficult to locate and characterize signal sources in complex environments.

Furthermore, in another example, there is a form factor constraints with traditional systems used for spectrum monitoring. Traditional benchtop units require significant space whole portable units sacrifice functionality for mobility. Furthermore, USB-controlled systems depend on external computing resources.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A wireless communication device and a method for wideband spectrum monitoring, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF DRAWINGS

FIGS. 4A, 4B, and 4C collectively, is a flowchart of a method for wideband spectrum monitoring, in accordance with an embodiment of the disclosure.

DETAILED DESCRIPTION OF THE DISCLOSURE

Figure 1:
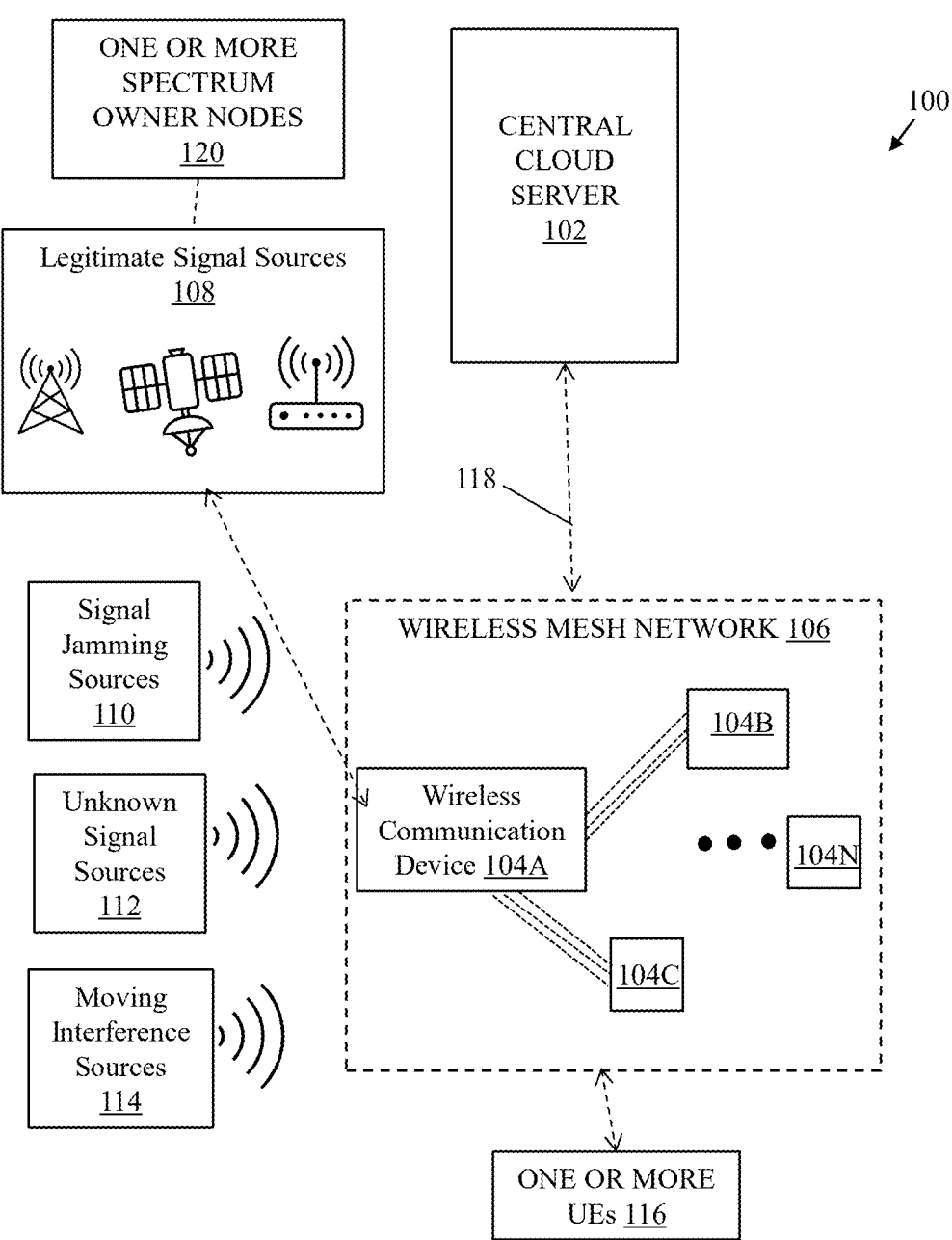
FIG. 1 is a diagram that illustrates an exemplary system for wideband spectrum monitoring, in accordance with an exemplary embodiment of the disclosure.

Certain embodiments of the disclosure may be found in a wireless communication device and a method for enhanced wideband spectrum monitoring.

Conventional systems manifest hardware complexity, such as multiple dedicated radio frequency (RF) front ends for different frequency bands, expensive analog to digital converters (ADCs) for high-bandwidth signal capture (e.g., >7 GHz), and complex signal processing hardware driving high spectrum analyzer costs. Additionally, conventional devices struggle with limited spatial awareness, making it difficult to locate and characterize signal sources in complex environments.

In contrast to conventional systems that require multiple dedicated RF front ends for different frequency bands, expensive analog-to digital converters (ADCs) for high-bandwidth signal capture (>7 GHz), and complex signal processing hardware driving high spectrum analyzer costs, the disclosed wireless communication device achieves enhanced wideband spectrum monitoring from DC to 300 GHz through an innovative frequency shifting architecture. The disclosed wireless communication device's RF front-end with plurality of band filters and tunable local oscillator configuration enables intelligent signal down-conversion to certain predefined intermediate frequencies (e.g., 2.4 GHz, 5 GHz, 6 GHz or 7 GHz) that may be processed by WLAN chipsets, thereby eliminating the need for expensive ADCs and complex signal processing hardware while maintaining high performance spectrum analysis capabilities. For example, the received RF signals captured from air of 0-100+ GHz may be down converted and digitized to desired intermediate frequencies, for example, frequencies like (5 GHz and 6 GHz) capable of being processed firstly in the WLAN chipset, which not only simplifies the signal processing but also reduces the cost effectively without any compromise in spectrum analysis results.

Furthermore, while conventional devices struggle with limited spatial awareness and single-band analysis limitations, the disclosed wireless communication device's concurrent processing architecture leveraging multi-link operation (MLO) capabilities enables concurrent analysis across multiple intermediate frequency bands. The disclosed wireless communication device's unique approach of executing frequency shifting operations with tuned local oscillator frequencies above a threshold frequency effectively pushes image frequencies into naturally attenuating regions of the spectrum, significantly reducing filtering complexity compared to traditional spectrum analyzers. This capability combined with the ability to perform real-time spectrum monitoring operation across multiple bands concurrently through MLO parameters, provides enhanced signal detection, improved interference rejection, and sophisticated pattern recognition capabilities previously requiring multiple expensive dedicated instruments, thus achieving improved performance wide-range spectrum monitoring while at the same time significantly reducing cost compared to traditional solutions. For example, in the disclosed wireless communication device, dual-polarized MIMO antenna array configuration may enable concurrent reception of vertical and horizontal polarizations, providing enhanced signal detection capabilities compared to single-polarization systems. This dual-polarization approach, combined with the MIMO array, significantly improves spatial diversity without requiring additional costly hardware.

FIG. 1 is a diagram that illustrates an exemplary system for wideband spectrum monitoring, in accordance with an exemplary embodiment of the disclosure. With reference to FIG. 1, there is shown a system 100 for enhanced spectrum monitoring across multiple frequency bands. The system 100 may include a central cloud server 102, a plurality of wireless communication devices, such as wireless communication devices 104A, 104B, 104C, . . . , 104N. In an implementation, the wireless communication devices 104A, 104B, 104C, . . . , 104N may be interconnected with each other in a wireless mesh network 106. In another implementation, each of the wireless communication devices 104A, 104B, 104C, . . . , 104N may function independently as a standalone device for enhanced spectrum monitoring across multiple frequency bands or may work in cooperation with each other for not only enhanced spectrum monitoring across multiple frequency bands but also wireless data communication and routing across the wireless mesh network 106.

There are further shown different types of signal sources, such as legitimate signal sources 108, signal jamming sources 110, unknown signal sources 112, and moving interference sources 114. The legitimate signal sources 108, for example, may be authorized and licensed wireless carrier network frequencies, for example, 4G or 5G signals from base stations or small cells, frequencies used for direct-to-cell service (e.g., satellite-to-cell phone service), or authorized wireless local area network (WLAN) signals (e.g., Wi-Fi® signals), or other legitimate commercial or non-commercial RF signals, as per use case. The legitimate signal sources 108 may be associated with one or more spectrum owner nodes 120. The wireless communication devices 104A, 104B, 104C, . . . , 104N may not be initially aware of the different types of signal sources and may perform RF signal (airwaves) scanning to detect and identify active signal sources and potential receivers operating on specific frequencies within range. In an implementation, the wireless communication devices 104A, 104B, 104C, . . . , 104N may be further communicatively coupled to the central cloud server 102, via a communication network 118.

The central cloud server 102 includes suitable logic, circuitry, and interfaces that may be configured to communicate with the wireless communication devices 104A, 104B, 104C, . . . , 104N (may also be referred to as network nodes or a mesh nodes). In an implementation, the central cloud server 102 may be communicatively coupled to each network node including the one or more user equipment (UEs) 116. In an example, the central cloud server 102 may be a remote management server that is managed by a third party different from the service providers associated with the plurality of different wireless carrier networks (WCNs), service providers or spectrum owners. In another example, the central cloud server 102 may be a remote management server or a data center that is managed by a third party, or jointly managed, or managed in coordination and association with one or more of the plurality of different WCNs or different service providers.

The wireless communication devices 104A, 104B, 104C, . . . , 104N may also be referred to as mesh nodes when connected to each other in the wireless mesh network 106. Each of the wireless communication devices 104A, 104B, 104C, . . . , 104N, may be configured to capture and monitor raw RF signals from direct current (DC, i.e. 0 hertz (Hz)) to 300 Gigahertz (GHz) and analyze the captured RF signals. Each of the wireless communication devices 104A, 104B, 104C, . . . , 104N may be a multi-functional device for spectrum-sensing across a plurality of frequency bands (DC to 300 GHz) as well as wireless data communication to one or more other wireless communication devices in the wireless mesh network 106. Examples of the wireless communication devices 104A, 104B, 104C, . . . , 104N, may include but are not limited to a wide-range spectrum monitoring device or a special dual-purpose device for spectrum monitoring and wireless data communication, a modified repeater device, or a 5G backplane system. The wireless communication devices 104A, 104B, 104C, . . . , 104N may be portable devices.

The wireless mesh network 106 may be a resilient, high-capacity wireless network that extends the reach of a fiber backbone to provide widespread coverage to end users, such as the one or more UEs 116 via the wireless communication devices 104A, 104B, 104C, . . . , 104N. The fiber backbone (not shown) may be a high-performance, fiber-optic core network infrastructure that connects central offices, data centers, and the wireless mesh network 106. The fiber backbone may aggregate traffic from the central offices and data centers and provide seamless integration between the fiber and wireless network components.

The legitimate signal sources 108 may refer to authorized transmitters operating within licensed frequency bands in compliance with regulatory standards and predetermined protocols. Examples of the legitimate signal sources may include, but not limited to, cellular base stations, small cells, or repeaters, Licensed FM/AM radio stations, commercial broadcast transmitters, public safety communications, satellite downlinks, authorized military communications within designated bands (if that is required in a use case), authorized Wi-Fi® signals, GPS satellites operating at 1575.42 MHz, and licensed point-to-point microwave links (e.g., cellular backhaul links operating at Jun. 11, 2018/23 GHz or other bands, financial trading networks using $^{70}/_{80}$ GHz E-band, Broadcast studio-to-transmitter links (STL), for example, at 950 MHz, utility Supervisory Control and Data Acquisition (SCADA) networks operating at $^4/_6$ GHz, enterprise building-to-building connections at 60 GHz, or public safety backhaul networks at 4.9 GHz, or Internet service provider backbone links).

The signal jamming sources 110 may refer to devices deliberately emitting interference signals designed to disrupt or degrade wireless communications across single or multiple frequency bands. Examples of the signal jamming sources may include, but not limited to, GPS jammers, cellular blockers (e.g., multi-band jammers (GSM/CDMA/3G/4G/5G), Frequency hopping cell disruptors, Band-specific blockers (700 MHz/850 MHz/1900 MHz), Smart jammers targeting control channels, or Base station signal overriders), broadband noise generators, targeted frequency disruptors, and pulsed interference systems.

The unknown signal sources 112 may refer to transmitters producing RF emissions that do not conform to known signal characteristics, protocols, or authorized frequency allocations. Examples of the unknown signal sources may include, but not limited to, unidentified transmitters, non-standard modulation signals, encrypted transmissions of unknown origin, sporadic unauthorized emissions, and signals using uncharacterized protocols.

The moving interference sources 114 may refer to mobile entities generating RF interference that change spatial location over time, whether intentional or unintentional. Examples of the moving interference sources may include, but not limited to, vehicles with malfunctioning electronics, mobile jamming platforms, interference-generating drones, vessels with non-compliant radio systems, and portable unauthorized transmitters in motion.

The one or more UEs 116 may correspond to a wireless device, such as a client device or a telecommunication hardware used by an end-user to communicate. Some of the one or more UEs 116 may refer to a combination of a mobile equipment and subscriber identity module (SIM). Examples of the one or more UEs 116 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

The communication network 118 may refer to the infrastructure and protocols enabling secure data exchange between the wireless communication devices 104A, 104B, 104C, . . . , 104N and the central cloud server 102 through one or more known wireless transmission mediums.

The one or more spectrum owner nodes 120 may be configured to communicate with the central cloud server 102. The central cloud server 102 may obtain frequency spectrum availability metadata and custom-defined access parameters from the one or more spectrum owner nodes 120. The system 100 may allow spectrum owners to define customized access rules and data routing logic, via the one or more spectrum owner nodes 120. The spectrum owners may specify smart contract rules encoding authorization credentials like crypto keys for allowing client devices, such as the one or more UEs 116, to dynamically subscribe to and use owned bands or underutilized spectrum.

The various operations of the disclosed system 100 may be explained by taking an example of one wireless communication device, such as the wireless communication devices 104A. It is to be understood that operations described for the wireless communication device 104A may be applicable to other wireless communication devices 104B, 104C, . . . , 104N. For example, each of the wireless communication devices 104A, 104B, 104C, . . . , 104N may be configured to perform wideband spectrum monitoring with high sensitivity and dynamic range while intelligently utilizing the processing capabilities of a commercial WLAN chipset (e.g., IEEE 802.11be chipset and modems) modified for signal monitoring with intelligent signal down conversion and signal processing architectures to achieve wide frequency range coverage (DC to 300 GHz) in a cost-effective manner.

Typically, IEEE 802.11be/ax (Wi-Fi® 7/6E) hardware is conventionally designed for high-throughput wireless networking, operating in 2.4 GHz, 5 GHz, and 6 GHz bands. It provides features like multi-link operation (MLO), 320 MHz channels, 4K Quadrature Amplitude Modulation (QAM) modulation, and multi-user Multiple-Input Multiple-Output (MIMO) primarily for data communication between access points and client devices.

The present disclosure intelligently modifies and repurposes IEEE 802.11be/ax hardware beyond its standard networking role by integrating wideband spectrum monitoring capabilities. In an example, the wireless communication device 104A may leverage the hardware's advanced signal processing capabilities while extending frequency coverage from DC to 300 GHz through multi-stage conversion (otherwise primary coverage is only frequency range of 1-7 GHz and that too not for spectrum monitoring purpose). This adaptation enables concurrent operation as a wireless networking device and a spectrum monitoring platform, utilizing features like MLO and high-speed signal processing for signal detection, classification, and analysis across a significantly broader range than traditional Wi-Fi® operations. The wireless communication device 104A maintains networking functionality in the system 100 while adding capabilities for detecting different types of signal sources, such as legitimate signal sources 108, signal jamming sources 110, unknown signal sources 112, and moving interference sources 114.

In an implementation, multiple monitoring nodes, such as the wireless communication devices 104B, 104C, . . . , 104N, may operate concurrently across different frequency bands. In such a case, each node may perform local analysis, and the data is then sent to a central fusion center, such as the central cloud server 102, for real-time processing and combining. This distributed approach may further allow for enhanced spatial coverage, improved jammer resistance through diversity, and scalable deployment while maintaining high-resolution analysis capabilities.

In an example, a scenario may be considered where a 100 GHz signal needs to be monitored. Conventional spectrum analyzers may require dedicated expensive hardware including specialized ADCs capable of handling >7 GHz bandwidth directly. In contrast, the wireless communication device 104A of the present disclosure may employ a novel multi-stage frequency conversion approach where the 100 GHz signal may be first converted to 15 GHz using an 85 GHz local oscillator generator, with the image frequency at 185 GHz being naturally attenuated. A second conversion stage may utilize a 9 GHz local oscillator generator to convert the 15 GHz signal to 6 GHz, which may then be processed by a WLAN chipset, thereby eliminating the need for expensive specialized hardware while maintaining analysis capabilities. Furthermore, the wireless communication device 104A of the present disclosure employs MLO-based concurrent processing, which enables concurrent monitoring of both 5 GHz and 6 GHz intermediate frequency bands with real-time cross-correlation. For example, when a frequency hopping signal transition between 5 GHz and 6 GHz bands, the system's concurrent processing architecture may track and correlate these transitions in real-time, enabling detection of coordinated transmission patterns and improved interference rejection through spatial diversity from MIMO arrays. Such capabilities may otherwise require multiple expensive dedicated instruments in conventional systems while still are mostly ineffective for such wideband spectrum monitoring.

Figure 2:
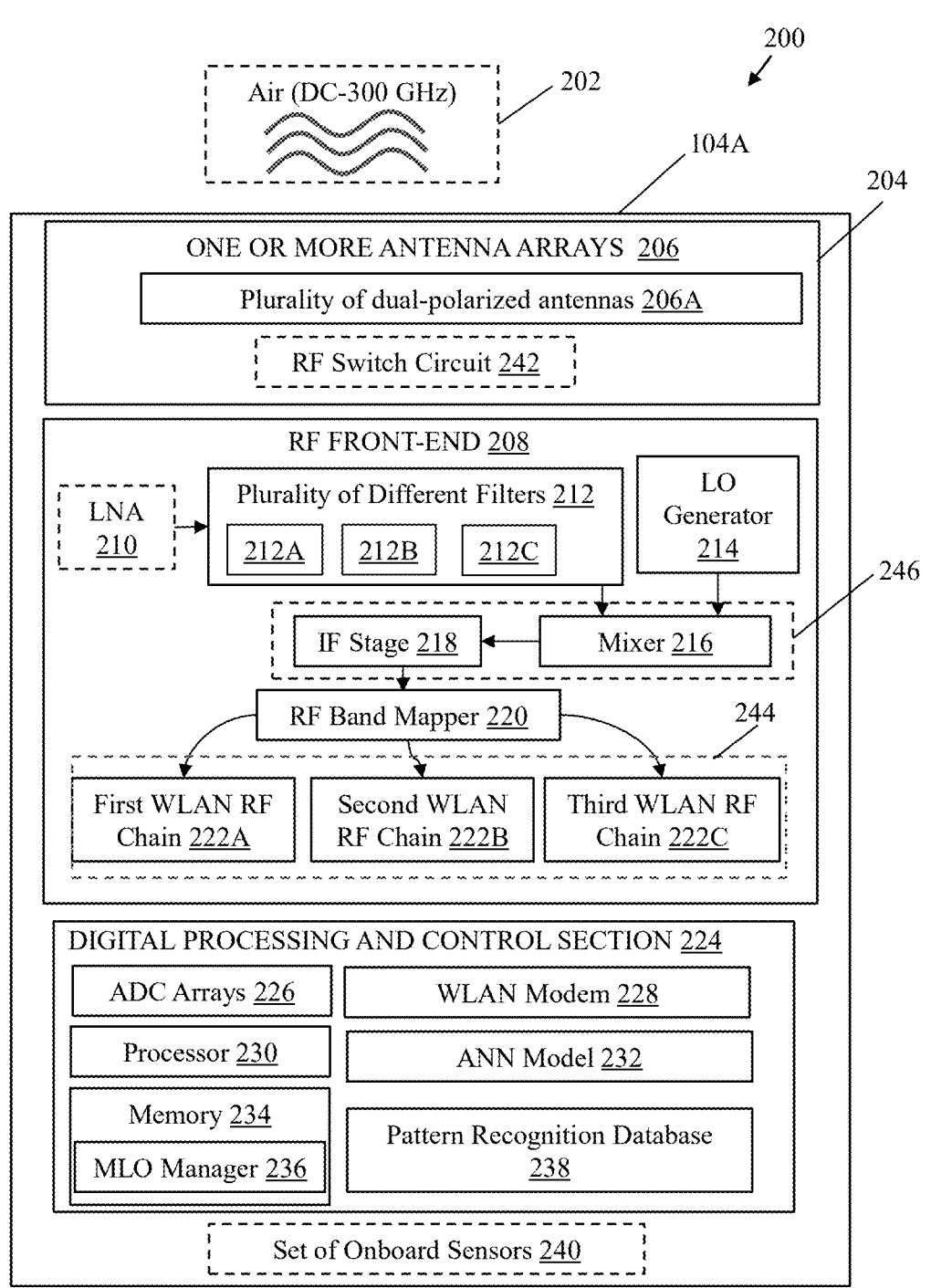
FIG. 2 is a block diagram that illustrates various components of an exemplary wireless communication device for wideband spectrum monitoring, in accordance with an exemplary embodiment of the disclosure.

FIG. 2 is a block diagram that illustrates various components of an exemplary wireless communication device for wideband spectrum monitoring, in accordance with an exemplary embodiment of the disclosure. FIG. 2 is explained in conjunction with elements from FIG. 1. With reference to FIG. 2, there is shown a block diagram 200 of the wireless communication devices 104A.

The wireless communication devices 104A may include a radio frequency (RF) input 204. The RF input 204 may include one or more antenna arrays 206. The one or more antenna arrays 206 may include a plurality of dual-polarized antennas 206A. In an implementation, the antenna array system, such as a MIMO antenna array may include a radio frequency (RF) switch circuit 242. The wireless communication devices 104A may include an RF front-end 208 and a digital processing and control section 224.

The RF front-end 208 may include a Low-Noise Amplifier (LNA) 210, a plurality of different filters 212, a local oscillator generator 214, a mixer 216, an intermediate frequency (IF) stage 218, an RF band mapper 220, a WLAN radio (e.g., an IEEE 802.11be radio) comprising distinct RF chains for concurrent operations across different frequency bands, such as a first WLAN radio chain 222A (e.g., RF chain 1 for 2.4 GHz band processing), a second WLAN radio chain 222B (e.g., RF chain 2 for 5 GHz band processing), and a third WLAN radio chain 222C (e.g., RF chain 3 for 6 GHz band processing). Each chain may comprise dedicated components (LNA, mixers, filters) optimized for its specific frequency band, enabling simultaneous multi-band operation (not shown for the sake of brevity).

The digital processing and control section 224 may be configured to handle digital processing (e.g., analog to digital conversions, digital signal processing, multi-link operations (MLO) processing, baseband processing etc.), WLAN modem functions, as well as system control functions (e.g., a system on a chip (Soc)). The digital processing and control section 224 may include ADC arrays 226, a WLAN modem 228, a processor 230, an artificial neural network (ANN) model 232, a memory 234 with an MLO manager 236, and a pattern recognition database 238. In an implementation, the wireless communication devices 104A may further include a set of onboard sensors 240.

The RF input 204 may be configured to receive RF signals across a plurality of frequency bands in a range of direct current (DC) to 300 gigahertz (GHz). The RF input 204 may include one or more antenna arrays 206, such as a MIMO antenna array and a wideband antenna array. The one or more antenna arrays 206 may include the plurality of dual-polarized antennas 206A configured to receive radio frequency signals in vertical and horizontal polarizations across the plurality of frequency bands, for example, ranging from direct current (DC) to 300 GHz. The one or more antenna arrays 206 may incorporate dedicated MIMO elements for 2.4/5/6 GHz Wi-Fi® bands and wideband antenna elements for full spectrum coverage (e.g., DC-300 GHz) enabling comprehensive spectrum monitoring capabilities across multiple frequency bands (i.e., not only supports primary coverage from 1-7 GHz but manifest extended range capability to DC-300 GHz through multi-stage conversion techniques).

The RF front-end 208 may be configured to apply band-specific filtering to the received radio frequency signals to isolate signals-of-interest with at least 50-80 decibels of spurious signal suppression. In an implementation, the RF front-end 208 may maintain a noise figure below 3 decibels and phase noise performance of −110 dBc/Hz at 10 kHz offset with dynamic range exceeding 90 decibels. The RF front-end 208 may comprise low noise amplification stages, pre-filtering components, first stage mixing with local oscillator, and initial intermediate frequency stage processing.

The RF band mapper 220 may be configured to perform mapping of received radio frequency signals to predefined intermediate frequencies (e.g., 2.4 GHz, 5 GHz, or 6 GHz). The RF band mapper 220 may enable concurrent processing of signals across multiple frequency bands. The RF band mapper 220 may perform demultiplexing of signals into WLAN bands (Wi-Fi® bands) and provide dedicated signal paths for 2.4/5/6 GHz processing with multi-stage frequency conversion.

The ADC arrays 226 may refer to analog-to-digital converter arrays configured to digitize the down-converted signals for processing. The WLAN modem 228 may refer to a wireless local area network modem configured to handle baseband signal processing, including digital processing operations such as Fast Fourier Transform (FFT)/Inverse Fast Fourier Transform (IFFT), signal equalization, Medium Access Control (MAC) layer processing, and Quality of Service (QoS) management.

The processor 230 may be configured to execute spectrum analysis, signal classification, and cross-band correlation across multiple intermediate frequency bands (e.g., 5 GHz and 6 GHz). The processor 230 may be part of Soc and may incorporate one or more processing units including Central Processing Unit (CPU), Neural Processing Unit (NPU), and Digital Signal Processor (DSP) for specialized signal processing tasks.

The memory 234 may refer to a storage configured to store processing data and signal patterns. The memory 234 may provide hierarchical memory architecture for efficient data access and processing. Examples of implementation of the memory 234 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory.

The MLO manager 236 may refer to a multi-link operation manager configured to control concurrent processing across multiple frequency bands and manage system interfaces for coordinated operation.

The pattern recognition database 238 may refer to a database system configured to maintain historical signal correlation patterns and update correlation thresholds based on pattern recognition results, enabling adaptive learning and pattern evolution tracking.

The set of onboard sensors 240 refers to environmental and operational sensors configured to provide supplementary data to support signal classification and threat assessment capabilities, where the sensors enable enhanced contextual awareness for signal processing decisions. For example, the set of onboard sensors 240 may include one or more image sensors, a lidar sensor, a Radar, a spatial position sensor, an inertial measurement unit (IMU) sensor, and a temperature sensor. A wide range of sensors may be integrated or connected to enrich each wireless communication device 104A with environmental awareness for intelligent intra-node and inter-node optimizations. For example, the one or more image sensors may be used to visually monitor the surroundings of each network node. The lidar sensor may be referred to as light detection and ranging sensors used to enable accurate three-dimensional (3D) profiling and depth perception of surroundings of each network node for precise beam alignment. The Radar may be a built-in radar to detect and track motion to monitor movement patterns of surrounding objects and predict potential RF signal blockers. The spatial position sensor may be a global navigation satellite system (GNSS) sensor, such as global positioning system (GPS) to provide location awareness for each network node used for geospatial analytics and positioning capabilities. The IMU sensor may include a combination of accelerometers, gyroscopes, and magnetometers (sometimes magnetometers may not be used) that typically measures the body's specific force, angular rate, and orientation of a given body. In this case, such raw IMU output may be processed to measure node vibrations, shocks, and orientation changes at each network node.

The RF switch circuit 242 may refer to a radio frequency switch circuit configured to route signals between multiple antenna elements with switching time less than 100 microseconds and frequency step size of 100 kHz. The RF switch circuit 242 may enable rapid transitions between frequency bands for continuous spectrum monitoring. In an implementation, the RF switch circuit 242 may be configured to perform dynamic beam steering by switching between different phased antenna arrays installed at different positions around the wireless communication device 104A to route RF signals along different directions as required. This enables adaptable signal propagation, responding to changing network conditions and optimizing communication paths for improved reliability and performance.

The WLAN radio 244 may be a part of a WLAN chipset. The WLAN radio 244 may include distinct RF chains for concurrent operations across different frequency bands, such as the first WLAN radio chain 222A (e.g., RF chain 1 for 2.4 GHz band processing), the second WLAN radio chain 222B (e.g., RF chain 2 for 5 GHz band processing), and the third WLAN radio chain 222C (e.g., RF chain 3 for 6 GHz band processing). Each chain may comprise dedicated components (LNA, mixers, filters) optimized for its specific frequency band, enabling simultaneous multi-band operation. The circuitry 246 may include the mixer 216, the IF stage 218, and/or other control circuits.

In operation, the RF input 204 may be configured to receive RF signals across a plurality of frequency bands in a range of direct current (DC, i.e., 0 Hz) to 300 gigahertz (GHz). The RF input 204 may comprise the one or more antenna arrays 206 that comprises the plurality of dual-polarized antennas 206A configured to capture the RF signals in vertical and horizontal polarizations across the plurality of frequency bands. In FIG. 2, the RF signals in the air captured by the one or more antenna arrays 206 may be represented by wavy lines (i.e., the airwave 202). In an example, the one or more antenna arrays 206 may be a 4×4 MIMO array. In an implementation, the one or more antenna arrays 206 may be an antenna array system that may include one or more wide array antennas and may provide 360° coverage pattern. In an implementation, the one or more antenna arrays 206 may include four independent antenna elements with different phases (0°, 90°, 180°, 270°). The one or more antenna arrays 206 may be configured to receive multiple independent data streams concurrently on different antennas, effectively increasing capacity without requiring more bandwidth and when receiving the same signal from different antennas may provide diversity gain to combat fading and improve signal reliability. Further, the plurality of dual-polarized antennas 206A are configured to enhance signal reception and improve spectral efficiency by capturing RF signals in both vertical and horizontal polarizations across multiple frequency bands. For example, each antenna element within the one or more antenna arrays 206 may be equipped with orthogonally oriented dipoles or patch radiators that are capable of concurrently receiving RF signals in both vertical and horizontal polarization planes. In this case, since each antenna element supports two independent polarization modes (vertical and horizontal), the combination of MIMO with dual polarization effectively doubles the data communication capacity without increasing bandwidth or frequency usage. Further, as the plurality of dual-polarized antennas 206A allow two independent communication channels per antenna, the need for additional physical antennas is reduced, which may be useful for space-limited applications for compact antenna design and contribute to portability of the wireless communication device 104A. The combination of MIMO feature with the dual-polarized antennas allows the wireless communication device 104A to capture signals from multiple spatial points and enhances detection accuracy with full polarization coverage for all types of transmissions. This helps detect hidden, weak, or non-line-of-sight (NLOS) signals, useful in crowded RF environments.

In accordance with an embodiment, the plurality of frequency bands captured by the one or more antenna arrays 206 may range from DC to 100 gigahertz (GHz). In other words, the wireless communication device 104A may perform a real-time, wide-band spectrum monitoring across frequencies ranging from DC to 100 GHz with high resolution (for example, down to 19.53125 kHz). In accordance with an embodiment, the plurality of frequency bands captured by the one or more antenna arrays 206 may range from direct current (DC) to 300 gigahertz (GHz). The wireless communication device 104A may be a multi-function device for spectrum-sensing across the plurality of frequency bands with high resolution as well as wireless data communication to one or more other wireless communication devices 104B, 104C, . . . , 104N in the wireless mesh network 106. In other words, each network node functions as both a spectrum analyzer and a high-speed communication endpoint.

In accordance with an embodiment, the RF front-end 208 may be coupled to the one or more antenna arrays 206. The RF front-end 208 may comprise the plurality of different filters 212. The plurality of different filters 212 may be configured to apply band-specific filtering operation to the received RF signals across the plurality of frequency bands to obtain filtered RF signals. In an implementation, the LNA 210 may be placed before pre-filtering stage, as spectrum monitoring may often involve detecting weak or distant signals (e.g., covert transmissions, military radar, low-power IoT devices). Further, to sniff RF signals from the airwave 202, especially the broad frequency range (e.g., DC-300 GHz), the LNA 210 first approach ensures that signals across all frequencies are captured with minimal loss before band-specific filtering. The LNA 210 may amplify such weak signals before they encounter any filtering losses, improving detection accuracy. In some implementations, the LNA 210 may not be placed before the plurality of different filters 212 to reduce out-of-band interference. The wireless communication device 104A may opt for both options of LNA 210 first or without LNA 210 alternatively to see if there is any difference in spectrum monitoring results for enhanced analysis.

In an example, the plurality of different filters 212 may be pre-filters that may process signals across distinct frequency ranges. The plurality of different filters 212 may include a first band filter 212A (e.g., a low-band filter) configured to process the received RF signals in a first frequency range. The plurality of different filters 212 may further include a second band filter 212B (e.g., a mid-band filter) configured to process the received RF signals in a second frequency range, where the second frequency range may be higher than the first frequency range. The plurality of different filters 212 may further include a third band filter 212C (e.g., a high-band filter) configured to process the received RF signals in a third frequency range, where the third frequency range may be higher than the second frequency range. In an implementation, the first frequency range may be 1 hertz (Hz) to 1 GHz, the second frequency range may be 1.1 to 3 GHz, and the third frequency range may be between 3.1 GHz to 300 GHz. In another implementation, the first frequency range may be 50 MHz to 2 GHz, the second frequency range may be 2.4 to 6 or 7 GHz, and the third frequency range may be between 7.1 GHz to 300 GHz. The first frequency range that may be used for low band filtering operation may eliminate interference from TV, FM, and LTE signals. The second frequency range that may be used for mid band filtering operation may be used to suppress cellular and adjacent Wi-Fi® bands, and the third frequency range may be used for high band filtering operation may isolate high-frequency signals from 5G, radar, and millimeter-wave sources. In an implementation, the RF front-end 208 may employ a multi-stage filtering architecture that may include cavity filters providing high-Q resonance, Surface Acoustic Wave (SAW) filters, and Bulk Acoustic Wave (BAW) filters for precise frequency selectivity. In some implementation, the wireless communication device 104A may implement an adaptive digital filtering operation using DSP-based notch filters after the analog filtering stage, which may enhance the overall spurious signal rejection capabilities. Further, the implementation of narrowband bandpass filters may enable selective passing of signals-of-interest while maintaining substantial attenuation of unwanted RF signals, wherein the multi-stage spurious suppression techniques may achieve 50-80 dB of rejection. This comprehensive filtering approach may be particularly advantageous in dense RF environments where multiple interfering signals may be present, enabling the system to effectively isolate and monitor specific frequency bands of interest while maintaining high signal quality through robust interference suppression.

In accordance with an embodiment, the band-specific filtering operation may include determining an input RF signal frequency and directing the input RF signal through one of three concurrent filtering paths based on frequency range. For example, a first path employing a low-band filter for frequencies of 1 Hz to 2 GHz (or 50 MHz to 1 GHz as per use case) with subsequent up-conversion, a second path employing a mid-band filter for frequencies of 2.4 GHz to 7 GHz (or 1.1 to 3 GHz) with direct conversion, and a third path employing a high-band filter for frequencies of 7.1 GHz to 300 GHz (or 3.1 to 300 GHz) with down-conversion, wherein filtered signals from all paths may converge at the circuitry 246 (e.g., a mixer stage, such as the mixer 216) that may utilize a high-side local oscillator (e.g., the local oscillator generator 214) that may operate above a threshold frequency of 9.8 GHz for final frequency conversion, thereby achieving efficient spectrum coverage while maintaining signal integrity. The second band filter (i.e., the mid-band filter) for frequencies of 2.4 GHz to 7 GHz (or 1.1 to 3 GHz) may be configured to perform direct conversion as frequencies are already close to the predetermined intermediate frequencies (e.g., the Wi-Fi® frequencies).

In accordance with an embodiment, the local oscillator generator 214 may be configured to generate tunable local oscillator frequencies above a threshold frequency. In an example, the threshold frequency may be 9.8 GHz. The circuitry 246 may be coupled to the plurality of different filters 212 and the local oscillator generator 214. The circuitry 246 may be further configured to determine an input RF signal frequency of the received RF signals from among the plurality of frequency bands of Dc to 300 GHz. The circuitry 246 may be further configured to generate, via the local oscillator generator 214, a specific local oscillator frequency that is higher than the determined RF signal frequency by a defined offset. The circuitry 246 may be further configured to perform a high-side injection based on the specific local oscillator frequency to push the image frequencies above the threshold frequency (while maintaining phase noise performance of better than −90 dBc/Hz (i.e., decibels relative to carrier) at 100 kHz offset). For example, when processing a 6 GHz signal, the local oscillator generator 214 may generate a frequency of 11 GHz to create a desired intermediate frequency at 5 GHz (e.g., 11 GHz-6 GHz=5 GHz) and an image frequency at 17 GHz (i.e., 11 GHz+6 GHz=17 GHz) that may be naturally attenuated, thereby enabling efficient frequency conversion while ensuring image frequencies are pushed into naturally attenuating regions of the spectrum. The local oscillator frequencies may be adjusted in real-time based on the detected input signal frequency, desired intermediate frequency for processing, required image frequency suppression, and phase noise optimization requirements. Further, the phase noise performance of better than −90 dBc/Hz (i.e., decibels relative to carrier) at 100 kHz offset) may be indicative of reduced phase noise (more negative dBc/Hz), which means better frequency stability and better stability as it enables more accurate frequency conversion and improved signal quality in the converted intermediate frequencies In accordance with an embodiment, the circuitry 246 may be configured to execute a frequency shifting operation in one or more frequency conversion stages in which one or more tuned local oscillator frequencies above the threshold frequency may be injected at the circuitry 246 to push image frequencies above the threshold frequency and shift the filtered RF signals to predefined intermediate frequencies. The frequency shifting operation may include either one or multiple frequency conversion stages, where each conversion stage may be configured to translate a received RF signal to a predetermined intermediate frequency through strategic local oscillator injection. When mixing occurs of the circuitry 246 (i.e., mixing of the tuned local oscillator frequency with the filtered RF signal at an RF frequency at the mixer stage, i.e., at the mixer 216), a sum and a difference frequency may be obtained. The difference frequency (RF-LO frequency) may be selected as the desired intermediate frequency (IF), such as 5 GHz, 6 GHz, or 7 GHz while the sum frequency becomes the image frequency and may be discarded. In this case, the cleverness may lie in the use of high-side local oscillator injection in which the image frequencies may be pushed above 9.8 GHz (e.g., the threshold frequency). At these high frequencies i.e., the image frequencies, the signals naturally attenuate more due to atmospheric absorption, path loss, material absorption, or component limitations. In this case, the IF selection may be predetermined ensuring compatibility with subsequent digitization hardware (e.g., the IEEE 802.11be chipset, such as the WLAN radio 244 and the WLAN modem 228). The down-conversion to predefined intermediate frequencies allows the wireless communication device 104A to leverage, for example, the IEEE 802.11be chipset's processing architectures, reducing hardware complexity, while re-purposing for enhanced spectrum monitoring as well as wireless data communication. Thus, the intelligent use of frequency shifting architecture provides simpler filtering requirements since images are naturally attenuated and enable cleaner signal conversion with less interference. The intelligent use of frequency shifting architecture reduces complexity and cost of the RF front-end 208 and improves overall system performance. In an example, the high-side local oscillator frequencies means that the local oscillator frequency may be higher than the target RF signal. The local oscillator generator 214 may be a tunable local oscillator that may generate different tuned local oscillator frequencies depending on detected input signal frequency in the filtered RF-signal and the desired intermediate frequency (e.g., 5 GHz or 6 GHz) to be generated and further processed.

It is to be understood that WLAN chipsets like Wi-Fi® 7 chips may only process certain frequencies (like 2.4 GHz, 5 GHz, 6 GHz). However, if many other frequencies (up to 300 GHz) are to be monitored then these other frequencies may be converted intelligently so the WLAN chipsets (e.g., the WLAN radio 244 and the WLAN modem 228) may understand them. In an example, the circuitry 246 may be configured to execute a multi-stage frequency shifting operation, where for signals in different frequency ranges, the following conversions may be implemented. For example, for signals at 100 GHz, a first stage conversion may inject an 85 GHz local oscillator frequency to achieve a difference frequency of 15 GHz (100 GHz-85 GHz=15 GHz) while producing an image frequency at 185 GHz (100 GHz+85 GHz=185 GHz), followed by a second stage employing a 9 GHz local oscillator frequency to convert the 15 GHz signal to a final intermediate frequency of 6 GHz (15 GHz-9 GHz=6 GHz), with the second image at 24 GHz image frequency (15 GHz+9 GHz=24 GHz) experiencing natural attenuation. The final intermediate frequency of 6 GHz may be one of the predefined intermediate frequencies.

In accordance with an embodiment, the circuitry 246 may be further configured to convert the filtered RF signals at the predefined intermediate frequencies in digital form to obtain digitized down-converted signals. The filtered RF signals at the predefined intermediate frequencies may be the down-converted IF signals, which may then be processed through an Analog-to-Digital Converter (ADC) that may sample and convert the analog IF signals into digital form. Further, the selection of predefined intermediate frequencies may be specifically configured to avoid interference from other signals while matching ADC bandwidth and resolution requirements. This down-conversion and digitization approach may enable advanced digital signal processing capabilities, including real-time filtering, demodulation, and pattern recognition, which may be particularly beneficial for spectrum monitoring applications requiring signal classification, anomaly detection, and cognitive RF adaptation for interference mitigation. In an example, the conversion process may include sampling the intermediate frequency signals (5 GHz and 6 GHz) using analog-to-digital converters (ADCs) operating at greater than twice the highest intermediate frequency, such that for the 6 GHz intermediate frequency, ADCs with sampling rate of at least 12 Giga-Samples per second (GSps) may be employed while maintaining effective number of bits (ENOB) of 10 or higher and achieving signal-to-noise ratio (SNR) better than 60 dB, and for the 5 GHz intermediate frequency, ADCs with sampling rate of at least 10 GSps may be utilized while maintaining ENOB of 10 or higher and achieving SNR better than 60 dB. The digitized down-converted signals may then be processed by the WLAN chipset, for example, the WLAN radio 244 for real-time spectrum analysis, thereby enabling efficient digital signal processing of the converted RF signals while maintaining signal integrity and dynamic range requirements for accurate spectrum monitoring.

In accordance with an embodiment, the RF front-end 208 may be further configured to demultiplex the filtered RF signals at the predefined intermediate frequencies into a plurality of different wireless local area network (WLAN) frequency channels. The RF front-end 208 may be further configured to assign a distinct signal processing path to each of the plurality of different WLAN frequency channels. The RF front-end 208 may be further configured to perform an RF mapping of the received RF signals in the plurality of frequency bands to one of the predefined intermediate frequencies corresponding to a first intermediate frequency band or a second intermediate frequency band. The first intermediate frequency band may be different from the second intermediate frequency band. Each of the predefined intermediate frequencies corresponding to the first intermediate frequency band and the second intermediate frequency band is one of: 2.4 GHz, 5 GHz, 6 GHz, 7 GHz, or other unlicensed or Industrial, scientific, and medical (ISM) frequency band. The RF band mapper 220 may be configured to demultiplex the filtered RF signals at the predefined intermediate frequencies (i.e. the down-converted signals in the predetermined intermediate frequencies (e.g., a common intermediate frequency or one or more predetermined intermediate frequencies)) into different WLAN frequency bands (e.g., 2.4 GHz, 5 GHz, and 6 GHz) and may assign dedicated paths for efficient processing. The frequency mapping may ensure that the signals are optimally allocated and processed based on resource availability. Based on the resource status, the best IF band assignment out of the different WLAN frequency bands may be done. Once the RF mapping is complete, the digitized down-converted signals signal may then be processed.

In an example, the RF mapping may incorporate channel and spatial mapping capabilities, wherein each frequency band may be divided into distinct channels, and spatial mapping may be performed to optimize beamforming and interference management. The wireless communication device 104A may implement a resource allocation mechanism that may dynamically check available resources and perform load balancing across the 2.4/5/6 GHz bands based on congestion levels. Further, the RF front-end 208 may assign dedicated processing paths to the different WLAN frequency bands, where the signals may undergo specific filtering, mixing, and digitization processes based on pre-defined IF mapping configurations. In other words, the RF front-end 208 may assign dedicated processing paths to the WLAN radio 244 (e.g., an IEEE 802.11be radio) comprising distinct RF chains for concurrent operations across different frequency bands, such as the first WLAN radio chain 222A (e.g., RF chain 1 for 2.4 GHz band processing), the second WLAN radio chain 222B (e.g., RF chain 2 for 5 GHz band processing), and the third WLAN radio chain 222C (e.g., RF chain 3 for 6 GHz band processing). Each chain may comprise dedicated components (LNA, mixers, filters) opti-mized for its specific frequency band, enabling simultaneous multi-band operation. This comprehensive RF mapping approach may enable efficient spectrum utilization and opti-mal signal processing, particularly beneficial for next opera-tion of implementing Multi-Link Operation (MLO) that may require dynamic frequency assignment across multiple bands while maintaining minimal interference and maxi-mum processing efficiency.

In accordance with an embodiment, the processor 230 may be configured to concurrently process the digitized down-converted signals in a first intermediate frequency band and a second intermediate frequency band correspond-ing to the predefined intermediate frequencies, based on configuration of multi-link operation (MLO) parameters in the wireless communication device 104A. The MLO param-eters may include buffer sizes for each Intermediate Fre-quency (IF) band that determine temporary data storage capacity (e.g., configured as powers of 2, like 4096 or 8192 samples), Fast Fourier Transform (FFT) window parameters (including window size, overlap percentage, and window function type) that control frequency resolution and process-ing accuracy, sampling rates for each Analog-to-Digital Converter (ADC) of the ADC arrays 226 that determine data acquisition speeds (e.g., 160 MHz for 5 GHz band, 320 MHz for 6 GHz band), cross-correlation thresholds that define sensitivity for pattern detection between bands (typically ranging from 0.7 to 0.95 for correlation coefficients), and memory allocation settings for continuous FFT buffers that manage ongoing computations through circular buffer implementations and cache-aligned memory allocation. The MLO parameters configuration may operate in concert to enable efficient concurrent processing, maintain processing continuity, prevent data loss, optimize resource utilization, and ensure reliable cross-band correlation, with their spe-cific values being tuned based on hardware capabilities, processing requirements, signal characteristics, and system performance targets. For example, the concurrent processing of digitized down-converted signals in 5 GHz and 6 GHz bands may be implemented by first configuring MLO parameters where the 5 GHz band may utilize a 4096-sample buffer with 160 MHz sampling rate and 1024-point FFT processing, while the 6 GHz band employs a larger 8192-sample buffer with 320 MHz sampling rate and 2048-point FFT to accommodate its higher bandwidth require-ments. The processor 230 may maintain two concurrent processing paths, where the first path (e.g., the second WLAN radio chain 222B) may handles the 5 GHz IF signals with a correlation threshold of 0.85 and 75% FFT window overlap for enhanced temporal resolution in potentially noisier environments, while the second path (e.g., the third WLAN radio chain 222C) may processes 6 GHz IF signals with a stricter 0.90 correlation threshold and similar 75% overlap for cleaner band operation.

In accordance with an embodiment, for the concurrent processing of the digitized down-converted signals for the spectrum monitoring, the processor 230 may be further configured to execute a sliding window Fast Fourier Trans-form (FFT) operation on the digitized down-converted sig-nals from each of the first intermediate frequency band and the second intermediate frequency band. The processor 230 may be further configured to maintain a continuous FFT buffer for each of the first intermediate frequency band and the second intermediate frequency band. The processor 230 may be further configured to compute cross-correlation coefficients between FFT outputs of the first intermediate frequency band and the second intermediate frequency band to detect temporal signal patterns. In other words, for spectrum monitoring, the processor 230 may continuously execute sliding window FFT operations on both bands concurrently, maintaining separate circular FFT buffers (4 memory blocks for 5 GHz, 8 for 6 GHz) to store historical FFT outputs, and compute cross-correlation coefficients between the bands with a minimum confidence threshold of 0.90 to detect temporal signal patterns and potential inter-ference. The cross-correlation coefficients may measure the similarity between signals in two different frequency bands (in this case, 5 GHz and 6 GHz) at different time shifts. The coefficient may range from $-1$ to 1, where "1" may indicate a perfect correlation (signals are very similar), "0" may indicate no correlation (signals are unrelated); and "$-1$" may indicate perfect negative correlation (signals are inversely related). The correlation coefficient calculation may normal-ize both signals, compute their dot product, and compare against the threshold (0.90). This MLO-based concurrent processing enables real-time spectrum analysis across both bands while optimizing resource utilization through band-specific parameter tuning, achieving enhanced spectrum monitoring capabilities through concurrent pattern detection and cross-band correlation analysis.

In accordance with an embodiment, the processor 230 may be further configured to perform a cross-band correla-tion between the processed digitized down-converted sig-nals from the first intermediate frequency band and the second intermediate frequency band to identify related sig-nal patterns. By taking the example of the cross-band correlation between 5 GHz and 6 GHz intermediate fre-quency bands, the related signal pattern may be identified by analyzing the temporal and spectral relationships between the processed digitized down-converted signals from both bands. The processor 230 may normalize the FFT outputs from both bands to account for power level differences and then may compute cross-correlation coefficients using a sliding window approach with a defined confidence thresh-old, for example, 0.90 confidence threshold. The related signal patterns may be identified through several key char-acteristics, such as temporal synchronization (where similar signal bursts appear in both bands with minimal time delay), spectral similarity (matching frequency components across bands indicating potential interference or legitimate multi-band transmissions), and amplitude correlation (relative signal strength patterns that occur simultaneously). For example, when a correlation coefficient exceeds 0.95, it might indicate strong cross-band interference like certain microwave emissions affecting both bands, while coeffi-cients between 0.90 and 0.95 could suggest legitimate Wi-Fi® traffic utilizing both bands for MLO operation. The processor 230 may maintain a pattern history buffer in the pattern recognition database 238 for each band and employs adaptive thresholding to distinguish between different types of related patterns, such as periodic interference (showing regular temporal patterns), burst transmissions (appearing as correlated spikes across bands), or continuous signal presence (sustained high correlation over extended periods), enabling real-time identification and classification of multi-band signal relationships.

In accordance with an embodiment, the processor 230 may be further configured to compute correlation matrices for signal segments from each first intermediate frequency band and the second intermediate frequency band for the cross-band correlation. The processor 230 may be further configured to merge correlation results using a synchronized timing reference to maintain a real-time or near real-time cross-band correlation. The correlation matrix for signal segments may refer to the relationship between signals across different intermediate frequency bands (e.g., 5 GHz and 6 GHz bands), where each element in the matrix indicates how strongly two segments may be related. For a 4×4 MIMO system with dual polarization, the correlation matrices may capture both spatial and temporal relationships between signal segments, for example, 320 MHz segments from each band (e.g., total 640 MHz bandwidth). In an implementation, the processor 230 may be configured to compute three distinct types of correlation matrices for comprehensive signal analysis across the across different intermediate frequency bands (e.g., 5 GHz and 6 GHz bands like Wi-Fi® 7 bands). For example, a spatial correlation matrix (4×4) that may compare signals between different antennas in the MIMO array showing similarity values between 0 (independent) and 1 (strongly related), a polar-ization correlation matrix (2×2) that may analyze vertical and horizontal polarization relationships (V-V, V-H, H-V, H-H) to understand signal propagation characteristics, and a temporal correlation matrix that tracks signal patterns and their evolution over time to identify recurring patterns or interference. Such correlation matrices may undergo a merg-ing process where time-stamped correlation results from different time windows may be combined using exponential weighting (favoring recent data) and normalized for proper scaling—for example, in a two-window scenario, a 5 GHz antenna signal [0.5, 0.8, 0.7] correlated with a 6 GHz signal [0.4, 0.7, 0.8] might show a strong correlation of 0.92 in the first window, while the same antenna signals [0.3, 0.4, 0.2] and [0.1, 0.2, 0.3] might show a weaker correlation of 0.45 in the second window, resulting in a merged moderate correlation of 0.68 after weighted averaging. This sophisti-cated correlation and merging process enables real-time signal tracking across bands, interference pattern detection, understanding of spatial relationships, monitoring of polar-ization changes, and identification of temporal patterns, all while maintaining synchronized timing references for accu-rate cross-band analysis.

In accordance with an embodiment, for the cross-band correlation, the processor 230 may be further configured to determine phase coherence between signals detected in the first intermediate frequency band and the second interme-diate frequency band. Further, for the cross-band correlation, the processor 230 may be further configured to track phase relationships over time to identify frequency-hopping pat-terns. In an implementation, the processor 230 may perform phase-based cross-band correlation by determining phase coherence between signals in the first intermediate fre-quency band (e.g., 5 GHz) and the second intermediate frequency band (6 GHz), while simultaneously tracking phase relationships over time to identify frequency-hopping patterns. The phase coherence determination involves mea-suring how well the phases align between the two bands (for example, a 5 GHz signal phase of $0.5\pi$ radians compared to a 6 GHz signal phase of $0.52\pi$ radians would yield a small phase difference of $0.02\pi$ radians, indicating high coherence with a value of 0.95), while the phase relationship tracking maintains a historical record of phase values to detect sudden changes and identify periodic patterns that might indicate frequency hopping behavior. Further, clock drift can affect phase measurements. Thus, the processor 230 may be configured to perform clock synchronization for cross-band phase analysis to maintain a common timing reference across both the first intermediate frequency (5 GHz) band sampled at 160 MHz and the second intermediate frequency (6 GHz) band sampled at 320 MHz, with nanosecond-level precision to ensure accurate phase coherence measurements. The processor 230 may continuously compensate for any clock drift between the bands by resampling signals to the highest rate (e.g., 320 MHz) and applying phase offset corrections based on timestamp comparisons, enabling pre-cise phase relationship tracking and reliable frequency hop-ping pattern detection.

In accordance with an embodiment, the processor 230 may be further configured to identify related signal sources or interference patterns based on the determined phase coherence and the tracked phase relationships over time. Furthermore, the processor 230 may utilize the phase infor-mation to identify related signal sources or interference patterns by analyzing both the coherence metrics and tem-poral phase relationships. For instance, a frequency hopping transmitter might exhibit high coherence (0.95) with syn-chronized phase hops every 100 ms across both bands (e.g., synchronized phase changes from $0.5\pi$ to $1.5\pi$ in both bands), while interference might show moderate coherence (0.65) with random phase changes and sporadic presence across bands. This dual approach of coherence measurement and temporal tracking enables the system to effectively distinguish between legitimate frequency-hopping signals and potential interference, providing enhanced spectrum monitoring capabilities in congested RF environment.

In accordance with an embodiment, the processor 230 may be further configured to monitor spectral density varia-tions in each of the first intermediate frequency band and the second intermediate frequency band. The processor 230 may be further configured to dynamically adjust bandwidth of the first intermediate frequency band and the second interme-diate frequency band to optimize the cross-band correlation, based on monitored spectral density variations. The proces-sor 230 may be configured to execute dynamic bandwidth adjustment by continuously monitoring spectral density variations across the different intermediate frequency bands (e.g., both the first intermediate frequency (5 GHz) and second intermediate frequency (6 GHz) bands) using density estimation and tracking of key metrics including average density, peak density, density variation, and active sub-bands. Based on these measurements, the processor 230 may dynamically adjust the bandwidth of each band within predefined ranges (e.g., 20-160 MHz for 5 GHz and 40-320 MHz for 6 GHz) using specific density thresholds, for example, when density falls below 0.3, bandwidth is reduced for efficiency; when density exceeds 0.8, bandwidth is increased for better coverage; and when density remains between these thresholds, current bandwidth is maintained. For example, if the 5 GHz band shows low density (e.g., 0.25), its bandwidth might be reduced from 160 MHz to 80 MHz, while the 6 GHz band showing high density (e.g., 0.85) would maintain its 320 MHz bandwidth, with all adjustments being made incrementally while continuously verifying cross-band correlation improvement. This dynamic adjustment process optimizes cross-band correla-tion accuracy, enables efficient resource utilization, improves interference detection capabilities, optimizes processing load, and enhances overall signal tracking performance by ensuring bandwidth allocation matches actual spectral conditions in real-time.

In accordance with an embodiment, the processor 230 may be further configured to execute adaptive beamforming using the one or more antenna arrays 206 to dynamically enhance signal reception in one or more first directions and cause null steering at one or more second directions. In the adaptive beamforming, radiation pattern of the one or more antenna arrays 206 may be adjusted in real-time to optimize signal reception. The processor 230 may execute adaptive beamforming using the one or more antenna arrays 206 (e.g. 4×4 MIMO antenna array) through a two-fold process. Firstly, the processor 230 may be configured to dynamically enhance signal reception in desired directions by computing and applying optimal beamforming weights (amplitude and phase), for example, based on Minimum Variance Distortion Less Response. For example, if a signal of interest is detected at 30 degrees, the processor 230 may calculate complex weights for each antenna element to form a beam maximum in that direction. Concurrently, null steering may be executed by projecting such beamforming weights onto the null space of interference directions. For example, if interference is detected at 90 degrees, the processor 230 may modify the beamforming weights to create a spatial null in that direction while maintaining the desired beam pattern. The weights may be continuously updated based on changing signal conditions, where the processor 230 may utilize spatial covariance estimation and interference-plus-noise modeling to optimize the beam pattern, achieving both objectives of signal enhancement and interference suppression concurrently. For example, when an interference source moves (e.g., one of the moving interference sources 114) from 90° to 100°, the processor 230 may immediately recalculate weights to shift the null position while preserving desired signal reception, thereby enabling dynamic interference rejection, consistent signal enhancement, and real-time beam pattern optimization for robust spectrum monitoring. In other words, the processor 230 may be further configured to maintain null positions for the null steering through adaptive tracking of the moving interference sources 114.

In accordance with an embodiment, the processor 230 may be configured to perform a null depth optimization operation where the processor 230 may dynamically adjust both a null width and a null depth based on interference source velocity of the moving interference sources 114. For example, when tracking a fast-moving interference source at 10 degrees per second, it creates a wider 15-degree null with −25 dB suppression, whereas for slower-moving sources at 2 degrees per second, it generates a narrower 5-degree null with −40 dB suppression, thereby achieving optimal interference suppression while maintaining tracking effectiveness. Advantageously, this null depth optimization operation ensures that nulls effectively follow the moving interference sources 114 while maintaining desired signal reception, with the null characteristics automatically optimizing based on the dynamic nature of the interference.

In accordance with an embodiment, the processor 230 may be further configured to determine an angle-of-arrival information for the received RF signals using phase differences among the plurality of dual-polarized antennas 206A. The processor 230 may be configured to determine the angle-of-arrival for received RF signals by implementing a sophisticated phase difference analysis across the 4×4 dual-polarized MIMO antenna array. The processor 230 may calculate phase differences between adjacent antenna elements separately for both vertical and horizontal polarizations using cross-correlation (signals [i]*conj(signals[i+1])) and then may combine these phase differences using a weighted average based on signal strength and polarization consistency. The angle-of-arrival calculation may utilize the formula $\theta=\arcsin(-(\Delta\varphi*\lambda)/(2\pi*d))$, where $\Delta\varphi$ represents the mean phase difference, $\lambda$ is the wavelength, and d is the antenna spacing (typically $\lambda/2$), with a novel confidence metric that evaluates both phase consistency within each polarization and agreement between polarizations. For example, when vertical and horizontal polarizations show phase differences of $\pi/4$ and $\pi/3$ respectively with high phase consistency (low standard deviation), the system assigns high confidence to the calculated angle-of-arrival. This dual-polarization approach enables more accurate and reliable angle-of-arrival estimation by leveraging both polarization components, where for example, an input of vertical phase differences [$\pi/6$, $\pi/3$, $\pi/2$] and horizontal phase differences [$\pi/4$, $\pi/3$, $\pi/2$] with $\lambda/2$ antenna spacing might yield a calculated angle-of-arrival of 30 degrees with a high confidence value of 0.92, indicating strong agreement between polarizations and reliable spatial localization of the signal source.

In accordance with an embodiment, the processor 230 may be further configured to detect frequency hopping patterns between the first intermediate frequency band and the second intermediate frequency band based on the cross-band correlation. The classification of the detected signals is further based on the detected frequency hopping patterns. The processor 230 may detect frequency hopping patterns between the 5 GHz and 6 GHz intermediate frequency bands by leveraging the cross-band correlation analysis through a multi-step process. For example, firstly, a time-synchronized buffer of FFT outputs may be maintained from both bands (using 4 memory blocks for 5 GHz and 8 for 6 GHz), then correlation coefficients may be computed between these bands at different time instants, creating a temporal correlation matrix that reveals signal jumps between frequencies. The processor 230 may be configured to look for characteristic patterns in the temporal correlation matrix where high correlation values (>0.90) appear alternately in different frequency bins across bands, indicating frequency hops. For example, a signal might show strong correlation at 5.2 GHz at time t1, then at 6.1 GHz at time t2, and back to 5.4 GHz at time t3, with consistent time intervals between hops indicating a structured hopping pattern rather than random interference. This pattern detection may be useful for signal classification as it helps distinguish between legitimate frequency-hopping signals (like modern wireless protocols) and sporadic interference or jamming attempts. The classification may consider factors such as hop timing regularity (e.g., consistent 100 ms intervals), frequency selection patterns (e.g., predetermined hop sequences), and correlation strength at hop instances (typically >0.90 for legitimate signals). The processor 230 may utilize this hopping pattern information alongside other parameters like spatial features and signal strength to make a final classification decision, enabling more accurate identification of signal types and potential security threats in the monitored spectrum.

In accordance with an embodiment, the processor 230 may be further configured to perform a real-time or near real-time spectrum energy detection in each of the first intermediate frequency band and the second intermediate frequency band. The processor 230 may perform real-time or near real-time spectrum energy detection across, for example, both the 5 GHz and 6 GHz intermediate frequency bands through a concurrent processing approach where it may continuously compute power spectral density (PSD) estimates using Welch's method with overlapping segments (75% overlap) and Hanning windows on the digitized down-converted signals from each band. The processor 230 may implement this by maintaining separate circular buffers (4 memory blocks for 5 GHz band processing 160 MHz bandwidth, 8 memory blocks for 6 GHz band processing 320 MHz bandwidth) and may perform the sliding window FFT operations (1024-point FFT for 5 GHz, 2048-point FFT for 6 GHz) to generate instantaneous power measurements across the frequency bins. For each band, the energy detection involves calculating the average power within specified frequency bins and comparing it against an adaptive threshold that is dynamically updated based on noise floor estimation. For example, if the measured energy in a particular 20 MHz channel exceeds the adaptive threshold by 10 dB, that channel is marked as active. The processor 230 may maintain a real-time occupancy map for each band, where energy levels, channel utilization, and temporal variations may be tracked to enable a real-time or near real-time detection of spectrum activity changes and potential interference sources while maintaining a typical processing latency under 100 microseconds to ensure true real-time monitoring capability.

In accordance with an embodiment, the processor 230 may be further configured to identify coordinated transmission patterns based on energy correlations using the spectrum energy detection. The processor 230 may be configured to identify coordinated transmission patterns by analyzing energy correlations derived from the real-time spectrum energy detection across, for example, both 5 GHz and 6 GHz intermediate frequency bands. For example, after energy pattern matrices are generated for each band using the power spectral density measurements from the sliding window FFT operations (1024-point FFT for 5 GHz, 2048-point FFT for 6 GHz), temporal cross-correlation between these energy patterns may be determined to detect synchronized activities. The processor 230 may be configured to find specific coordination signatures. For example, when energy bursts appear simultaneously or with fixed time offsets across different frequency channels (like a transmission at 5.2 GHz followed by a correlated burst at 6.1 GHz after a 50 ms delay), it indicates potential coordinated transmission patterns rather than random concurrent transmissions. These patterns may be characterized using metrics such as energy burst timing correlations (typically >0.85 for coordinated transmissions), spectral occupancy similarity across bands (matching bandwidth and duration patterns), and consistent inter-transmission intervals (e.g., synchronized 100 ms periodic transmissions across bands). For instance, if two signals show energy correlation coefficients above 0.90 with consistent 100 ms timing offsets between 5 GHz and 6 GHz bands, the processor 230 may classify such transmission as a coordinated transmission pattern, enabling identification of sophisticated multi-band communication systems and potential interference sources that operate across multiple frequency bands in a coordinated manner. In another implementation, beneficially, when analyzing transmissions between 5 GHz and 6 GHz bands, if two signals show energy bursts with temporal alignment within 1 μs (scoring 0.95), spectral occupancy similarity of 85% (scoring 0.85), and phase coherence of 0.90, the processor 230 may be configured to calculate an Energy Pattern Synchronization Index (EPSI) of (0.95*0.4+0.85*0.3+0.90*0.3=0.905), indicating highly coordinated transmission. Such EPSI metric may represent a unique approach to quantifying coordination levels in multi-band transmissions, enabling more accurate identification of sophisticated communication systems that might be employing advanced frequency hopping or band aggregation techniques. The addition of phase coherence to traditional energy correlation methods particularly enhances the system's ability to distinguish between truly coordinated transmissions and coincidental concurrent energy patterns.

In accordance with an embodiment, the processor 230 may be further configured to perform a real-time or near real-time spectrum monitoring operation based on the processed digitized down-converted signals. The real-time or near real-time spectrum monitoring operation may enable instant detection and classification of signals while maintaining high accuracy and low latency, suitable for dynamic spectrum environments requiring instant response to emerging signals or interference. The spectrum monitoring process may include enhanced signal analysis. For example, the FFT operation with 4096-point resolution on the processed digitized down-converted signals, the power spectral density calculations with 78.125 kHz resolution bandwidth, and maintenance of continuous processing buffer for real-time updates may achieve processing latency under 1 or 5 microseconds. The spectrum monitoring process may include signal detection and classification (e.g., based on monitored spectral energy variations in 5 GHz and 6 GHz bands concurrently, identification of signal patterns using the trained ANN model 232), detection of frequency hopping or spread spectrum analysis).

In accordance with an embodiment, the processor 230 may be further configured to classify detected signals based on the cross-band correlation, the null steering, and the angle-of-arrival information. The classification may begin with the processor 230 analyzing cross-band correlation patterns, where it examines correlation coefficients between frequency bands (e.g., values >0.90 indicating strong relationship), temporal synchronization patterns, and frequency hopping behaviors. This may be combined with null steering data that provides information about signal persistence and mobility (e.g., static interferers requiring fixed nulls versus mobile sources requiring adaptive null tracking), and precise angle-of-arrival measurements that may provide spatial context to the signals. For instance, when classifying a detected signal, the processor 230 may detect a cross-band correlation of 0.95 between 5.2 GHz and 6.1 GHz bands, with consistent frequency hops every 100 ms, stable null steering requirements at 30 degrees, and matching the angle-of-arrival measurements from both polarizations. Such a synergistic combination of characteristics may indicate a legitimate Wi-Fi® 7 device using MLO rather than an interference source. The multi-dimensional classification improves the following: classification accuracy, interference discrimination, and signal source identification with reduced false positives as the classification may be MLO-aware classification optimized for spectrum monitoring as well as wireless communication using multi-link operation capabilities. The classification criteria may adjust to changing RF environments. The synchronized processing of these three distinct signal characteristics (cross-band correlation, null steering, and the angle-of-arrival) creates a more robust and accurate classification that may distinguish between legitimate Wi-Fi® 7 MLO operations and potential interference or security threats.

Furthermore, advantageously, the synergistic combination of the cross-band correlation, the null steering, and the angle-of-arrival information ensure enhanced signal classification, where the combined analysis reveals patterns otherwise challenging or almost impossible to detect using individual parameters alone. The synergy may be described through real-world signal scenarios. For example, when analyzing a signal showing cross-band correlation of 0.92, stable null steering at 30°, and angle-of-arrival information of) 30° (+2°, individual parameter analysis may suggest either legitimate Wi-Fi® 7 or sophisticated interference, but the synergistic combination confirms a legitimate Wi-Fi® 7 MLO device by validating the precise alignment of correlation patterns with spatial characteristics. Similarly, a signal exhibiting 0.88 correlation with null steering and the angle-of-arrival information both showing coordinated movement from 30° to 45° may confidently be classified as a mobile Wi-Fi® 7 device through the synergistic analysis, whereas individual parameters might suggest potential interference. The power of this synergistic approach becomes even more evident when detecting sophisticated threats, for example, when encountering a signal with very high correlation (0.95) but erratic null steering requirements and multiple simultaneous information readings at 30°, 60°, and 90°, the combined analysis uniquely identifies this as a spoofing attack using multiple transmitters, a determination almost impossible through individual parameter analysis. This synergistic combination enables the system to achieve classification accuracy exceeding 95-99% (compared to approximately 70% with individual parameters), while providing enhanced capabilities for detecting sophisticated attacks that mimic legitimate signals, distinguishing between similar looking but different scenarios, and adapting to new signal types through pattern learning, all while maintaining real-time operation with high confidence. The wireless communication device 104A achieves an exponential increase in classification confidence and a significant reduction in false positives (e.g., >30% reduction in false positives).

In accordance with an embodiment, the classified signals may comprise one or more of legitimate signal communications (e.g., from legitimate signal sources 108), potential jamming signals (e.g., from the signal jamming sources 110), frequency hopping transmissions (e.g., from the moving interference sources 114), or unknown or anomalous signals tagged for further analysis (e.g., from the unknown signal sources 112).

In accordance with an embodiment, the processor 230 may be further configured to control the wireless communication device 104A to trigger an operational response based on the classified signals and the cross-band correlation. The operational response may comprise at least one of a spectrum monitoring and management action, a dynamic spectrum reallocation action to adjust spectrum resources to optimize network performance and reduce interference, or a distribution of spectrum monitoring information across a plurality of other wireless communication device 104 As in the wireless mesh network 106. In accordance with an embodiment, the spectrum monitoring and management action may be at least one of: selection of a frequency band and a polarization type at the wireless communication device 104A for data communication above a defined data throughput, adjustment of spectrum analysis parameters at the wireless communication device 104A or tracking and characterization of threat signals in a contested spectrum environment.

In an example, when the classified signals are legitimate signal communications (e.g., from legitimate signal sources 108, the processor 230 may be further configured to select optimal frequency bands for signal monitoring while maintaining current communication links; may adjust filter parameters of the plurality of different filters 212 and correlation thresholds in the cross-correlation to maintain signal quality based on validated patterns. The processor 230 may optimize spectrum resource allocation to enhance network performance. For example, in order to optimize band selection, the processor 230 may switch between 2.4/5/6 GHz bands based on interference levels. In another example, in order to optimize band selection, the processor 230 may dynamically select 6 or 7 GHz for 320 MHz bandwidth when higher throughput needed from a current throughput state or may switch back to 5 GHz for 160 MHz bandwidth when appropriate (e.g., throughput need decreased) or fall back to 2.4 GHz band when needed for redundancy. Further, in order to optimize resolution, the processor 230 may select between 19 kHz, 39 kHz, or 75 kHz subcarrier spacing in an example. In another example, the same data item may be sent via the first intermediate frequency band the second intermediate frequency band to not only improve reliability through redundant processing paths but also provide periodically cross-validation of signal characteristics which in turn enhances detection accuracy through multiple observations and provides better immunity against band-specific interference. Further, other operational responses when the classified signals are legitimate signal communications (e.g., from legitimate signal sources 108) may include but are not limited to spectrum usage coordinate and legitimate signal information sharing with other wireless communication devices 104B, 104C, . . . , 104N in the wireless mesh network 106, update of the pattern database with confirmed legitimate signal signatures, continuous spectrum monitoring to track signal characteristic changes, operational parameters adaptation based on evolving signal conditions. These actions may collectively ensure reliable handling of legitimate communications while optimizing system awareness and performance.

In another scenario, when the classified signals are potential jamming signals, the processor 230 may be configured to perform the following operational response or actions: may execute null steering through adaptive beamforming to minimize jamming signal reception while maintaining tracking of the moving interference sources 114; may optimize filter configurations and LO parameters for enhanced jamming rejection; may update detection parameters and correlation thresholds based on identified jamming patterns; may generate alerts when energy patterns match defined jamming threat criteria; may continuously monitor spectral density variations to assess jamming effectiveness; and may adapt bandwidth allocation to maintain optimal network performance in presence of jamming signals. These coordinated actions may enable effective jamming mitigation while maintaining network operation.

In yet another scenario, when the classified signals are the frequency hopping transmissions (e.g., from the moving interference sources 114), the processor 230 may dynamically adjust bandwidth and correlation parameters to maintain tracking as frequencies change; may perform cross-band correlation to validate detected frequency hops; may execute adaptive beamforming to maintain signal reception across frequency transitions; may update the pattern recognition database 238 with newly identified hopping sequences; may share hopping pattern information across the wireless mesh network 106 for coordinated monitoring; may generate alerts if hopping patterns match threat criteria; and may adapt spectrum allocation to minimize interference with legitimate communications. These coordinated actions may enable effective tracking and response to frequency hopping signals.

In another scenario, when the classified signals are the unknown or anomalous signals tagged for further analysis (e.g., from the unknown signal sources 112), the processor 230 may be configured to generate the following operational response (or perform the following actions): may execute enhanced cross-band correlation across both intermediate frequency bands to gather additional signal characteristics; may perform high-resolution spectral analysis by adjusting subcarrier spacing and LO drifting parameters; may compare signal patterns against the pattern recognition database 238 using the trained ANN model 232 for potential matches; may collect and store detailed signal parameters including modulation, timing, and frequency characteristics for further analysis; may distribute anomalous signal information across the wireless mesh network 106 to gather correlated observations; may generate alerts for persistent unknown patterns; may adapt signal detection thresholds for the unknown or anomalous signals to improve sensitivity for similar future signals; and may maintain continuous monitoring of the identified frequency bands where unknown signals were detected. These actions may enable comprehensive characterization and tracking of unknown signal sources.

In accordance with an embodiment, the processor 230 may be further configured to generate threat assessments based on the classified signals. The control of the wireless communication device 104A to trigger the operational response is further based on the generated threat assessments. The threat assessments may be based on real-time analysis of classified signals. The threat classification may be jamming detection, protocol violations, such as unauthorized or anomalous network behaviors, behavioral anomalies (e.g., using the ANN model 232 to recognize deviations from expected RF patterns), or signal origin tracking (e.g., locating sources of threats using multi-node triangulation and spatial processing). The processor 230 may be further configured to generate one or more alerts when the correlated energy patterns match a defined threat criteria as the operational response.

In accordance with an embodiment, the processor 230 may be further configured to update a database of historical signal correlation patterns (i.e., the pattern recognition database 238), after each event of the cross-band correlation. The processor 230 may be further configured to execute a trained artificial neural network model, i.e., the ANN model 232, to identify recurring signal patterns at each event of the cross-band correlation. In an example, the processor 230 may be configured to execute the trained ANN model 232, where the execution process may comprise real-time extraction of key features from correlated signals between the plurality of different predetermined intermediate frequency bands, such as 5 GHz and 6 GHz bands, including spectral energy distribution with 78.125 kHz resolution, phase relationships with 1 microsecond precision, power levels across 320 MHz bandwidth per band, temporal characteristics, and spatial signatures from the one or more antenna arrays 206, such as the MIMO array, followed by processing through multiple neural network layers that may include convolutional neural network (CNN) layers with 3×3 convolution kernels for spatial and spectral feature detection, Long short-term memory (LSTM) layers with, for example, 128 memory units, for temporal pattern analysis, and transformer layers with, for example, 12 attention heads, for contextual pattern extraction. The trained ANN model 232 may further employ a classification stage that produces pattern identifications with confidence levels exceeding 95-99% for legitimate Wi-Fi® signals, frequency hopping patterns, interference signatures, and unknown or anomalous signals, wherein the model may continuously update pattern recognition thresholds based on successful classifications while maintaining a historical pattern database, thereby enabling real-time identification of recurring signal patterns while achieving low false alarm rates in dynamic spectrum environments through continuous adaptation and learning from each cross-band correlation event.

In accordance with an embodiment, the processor 230 may be further configured to update correlation thresholds based on pattern recognition results from the identified recurring signal patterns at each event of the cross-band correlation. The threshold updating process may dynamically adjust multiple correlation parameters. The minimum correlation coefficient thresholds may range from 0.7 to 0.95 based on signal-to-noise ratios observed in identified patterns. The temporal correlation windows may be adjusted between 1 microsecond and 1 millisecond based on pattern duration statistics. The frequency correlation thresholds between 5 GHz and 6 GHz bands may be scaled according to observed cross-band energy distributions. The spatial correlation thresholds may be derived from MIMO channel state information. When a recurring pattern is identified with confidence level exceeding 90%, the correlation thresholds may be refined. The refinement may use a weighted average of historical and new threshold values with learning rate of 0.1 to 0.3. This adaptive threshold optimization may maintain detection sensitivity while minimizing false alarms. The optimization may continuously learn from successfully identified patterns across multiple cross-band correlation events.

In accordance with an embodiment, the processor 230 may be further configured to adjust detection parameters of signal correlation patterns in the cross-band correlation based on successful pattern matches to identify new or evolving signal patterns at one or more subsequent events of the cross-band correlation. In an example, the adjustment process may modify spectral detection windows from 20 MHz to 320 MHz based on observed signal bandwidth characteristics. The temporal detection thresholds may be adjusted between 100 nanoseconds to 1 millisecond based on pattern durations. The power level thresholds may be dynamically scaled between –90 dBm to –30 dBm according to signal strength distributions. The phase correlation parameters may be modified between 0 to 360 degrees based on observed phase relationships. The MIMO spatial signatures may be updated using successful detection events across the antenna array. Upon detecting a new signal pattern with 95% confidence level, the system 100 may create a new pattern template. The template may be added to the pattern database for future reference. The detection parameters may be continuously refined using a sliding window of the most recent, for example, 1000 successful pattern matches. This adaptive parameter adjustment may enable identification of emerging or modified signal patterns while maintaining detection accuracy across subsequent cross-band correlation events.

In accordance with an embodiment, the processor 230 may be further configured to classify signals based on the identified recurring signal patterns and the adjusted detection parameters of the signal correlation patterns in the cross-band correlation. The classified signals include legitimate signal communications, potential jamming signals, frequency hopping transmissions, or unknown or anomalous signals tagged for further analysis. The processor 230 may be configured to achieve synergistic signal classification by combining both identified recurring signal patterns and adjusted detection parameters. For example, using only identified recurring patterns may recognize known Wi-Fi® signals at 5 GHz with 85% accuracy but may miss evolving jamming patterns. Further, using only adjusted detection parameters may detect signal presence with 80% accuracy but may lack historical pattern context, while the synergistic combination may achieve enhanced classification accuracy exceeding 95-99% by correlating current signals against both known pattern templates and adaptively adjusted parameters.

In accordance with an embodiment, the synergistic combination may be exemplified in classifying a frequency hopping signal through multiple coordinated steps, where a pattern matching step may identify similar historical hopping sequences from the pattern database, such as signals hopping across 50 MHz bandwidth with each hop occurring every 100 microseconds. The adjusted detection parameters may track the current signal in real-time by monitoring actual hop timing, measuring bandwidth usage during each hop, and tracking power levels across frequency bands. The processor 230 may perform combined analysis by correlating the matched pattern with current parameters, where power levels may be measured at 20 dB above normal thresholds, detection bandwidth may be expanded to capture full hopping range, and cross-band correlation may reveal synchronized interference patterns appearing simultaneously in both 5 GHz and 6 GHz bands. The final classification may confirm hostile jamming activity based on the combined evidence with accuracy exceeding what either operation alone could achieve (i.e., only one of the identified recurring signal patterns or the adjusted detection parameters of the signal correlation patterns in the cross-band correlation). The processor 230 by use of the trained ANN model 232 may continue adapt to any changes in jamming characteristics, thereby enabling more accurate signal classification while maintaining adaptability to evolving signal characteristics in dynamic spectrum environments.

In accordance with an embodiment, the training of the ANN model 232 for wideband spectrum monitoring may follow a structured approach that may integrate deep learning techniques with real-time RF signal processing. In an exemplary implementation, the ANN model 232 may be used for identifying recurring signal patterns at each event of the cross-band correlation. The ANN model 232 may enable adaptive spectrum analysis by leveraging a combination of deep learning, specifically using CNNs, LSTMs, and Transformer-based architectures to recognize complex RF signatures. The training process may include data acquisition and preprocessing, where the system 100 may use some test wireless communication devices (e.g., like the wireless communication devices 104A, 104B, 104C, . . . , 104N) and capture RF signals using a 4×4 MIMO antenna array, such as the one or more antenna arrays 206, which may supports dual-polarization and operates from DC to 100 GHz or DC to 300 GHz. The signal filtering and conversion may be applied before digitization, using band-specific filtering to isolate signals of interest. Further, FFT and wavelet transforms may be used for spectral analysis, ensuring frequency-domain features are extracted. Thereafter, feature extraction may occur. The system 100 may apply multi-dimensional analysis combining spectral, temporal, and spatial processing to enhance detection accuracy. Further, MLO-based cross-band correlation may be used to align data from predefined frequency bands like the 5 GHz and 6 GHz bands. Further, features, such as modulation type, frequency components, interference patterns, and spatial signatures may be extracted. Thereafter, the ANN model 232 may be trained using labeled historical datasets stored in the pattern recognition database 238. The convolutional neural network (CNN) layers may be used to handle spatial features, while the Long short-term memory (LSTM) layers may be used for sequential pattern detection over time. Transformer-based models may be deployed for contextual feature learning and adaptive anomaly detection to further enhance detection and classification of signals. The federated learning techniques may be employed to enable distributed training across multiple nodes for real-time adaptation to obtain the trained ANN model 232.

In accordance with an embodiment, performance optimization to optimize network parameters may be carried out using Bayesian hyperparameter tuning. Further, Pruning, quantization, and knowledge distillation may help reduce computational overhead. The trained ANN model 232 may undergo real-time updates via online learning algorithms to adapt to new interference patterns. Examples of the online learning algorithms used may include Multi-Armed Bandit (MAB) Algorithms, Deep Q-Networks (DQN) for Spectrum Adaptation, or Incremental Learning (Online Backpropagation). Each node in the wireless mesh network 106 may contribute to global model updates (e.g., at the central cloud server 102) without sharing raw data. For example, learned interference features may be shared across different locations to enhance pattern recognition.

Furthermore, during execution, the trained ANN model 232 may process incoming RF data to detect signal anomalies, classify threats, and support dynamic spectrum reallocation. The system 100 may integrate edge computing for local signal classification and the central cloud server 102 (cloud ANN model) for large-scale anomaly detection. The trained ANN model 232 allows AI-enhanced spectrum monitoring enhanced real-time threat detection, dynamic signal classification, cross-band interference mitigation, and autonomous spectrum adaptation. By leveraging the Peltbeam's ANN model, such as the ANN model 232, wireless spectrum monitoring, signal identification, and interference analysis may be significantly enhanced across a wide range of frequency bands (DC to 300 GHz).

Figure 3:
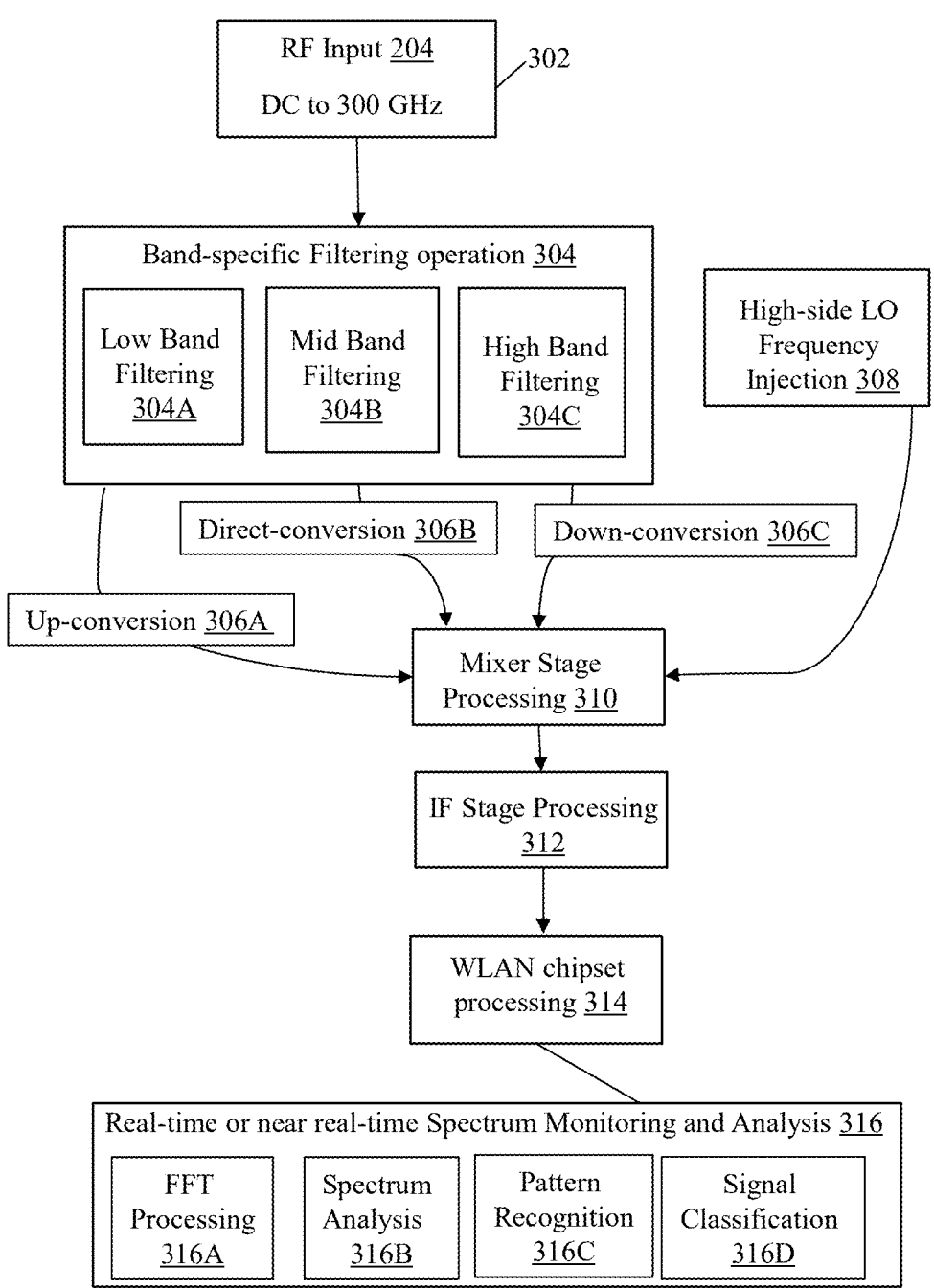
FIG. 3 is a diagram that illustrates an exemplary scenario for implementation of a wireless communication device for wideband spectrum monitoring, in accordance with an exemplary embodiment of the disclosure.

FIG. 3 is a diagram that illustrates an exemplary scenario for implementation of a wireless communication device for wideband spectrum monitoring, in accordance with an exemplary embodiment of the disclosure. FIG. 3 is explained in conjunction with elements from FIGS. 1 and 2. With reference to FIG. 3, there is shown an exemplary signal processing pipeline using operations 302 to 316 for an exemplary scenario of universal or wideband spectrum monitoring, such as monitoring of spectrum ranging from DC to 300 GHz, using an intelligent frequency shifting operation such that signals may be processed in a WLAN chipset (e.g., Wi-Fi® 7/6E chipset).

In this exemplary scenario, the wireless communication device 104A may integrate MIMO and MLO capabilities within a Wi-Fi® 7 or 6E-enabled system to enhance wideband spectrum monitoring. The wireless communication device 104A may leverage the intelligent frequency shifting operation to map any frequency from DC to 300 GHz into the processing range of the WLAN chipset (e.g., Wi-Fi® 7/6E chipset). The high-side local oscillator (LO) frequency injection at operation 306 may be intelligently used to push image frequencies above 9.8 GHz, where such image frequencies experience natural attenuation and are discarded, which in turn simplifies filtering requirements and ensures clean signal conversion. This frequency shifting architecture enables the system 100 or specifically the wireless communication device 104A to achieve wideband spectrum monitoring with high sensitivity and dynamic range while utilizing the processing capabilities of a commercial Wi-Fi® 7 chipset. The integration of MIMO and MLO within the Wi-Fi® 7 framework enables optimized spectrum utilization, interference mitigation, and adaptive signal analysis across multiple frequency bands, providing a robust and efficient solution for real-time wideband spectrum monitoring, data communication, and threat detection.

At operation 302, the RF input 204 may be configured to receive the radio frequency (RF) signals across a plurality of frequency bands in a range of direct current (DC) to 300 gigahertz (GHz). The one or more antenna arrays 206 in the RF input 204 may comprise the plurality of dual-polarized antennas 206A configured to capture the RF signals in vertical and horizontal polarizations across the plurality of frequency bands for enhanced signal diversity.

At operation 304, the band-specific filtering (e.g., low band, mid band, and high band filtering) may be applied to the received RF signals to the received RF signals across the plurality of frequency bands to obtain filtered RF signals. The plurality of different filters 212 may be configured to apply the band-specific filtering operation to the received RF signals across the plurality of frequency bands ranging from DC to 300 GHz to obtain the filtered RF signals.

At operation 304A, a low-band filtering may be executed. The plurality of different filters 212 may include the first band filter 212A (e.g., a low-band filter) configured to process the received RF signals in a first frequency range. In an implementation, the first frequency range may be 1 hertz (Hz) to 1 GHz or 50 MHz to 2.2 GHz.

At operation 304B, a mid-band filtering may be executed. The plurality of different filters 212 may further include the second band filter 212B (e.g., a mid-band filter) configured to process the received RF signals in a second frequency range, where the second frequency range may be higher than the first frequency range. In an example, the second frequency range may be 1.1 to 3 GHz or 2.4 GHz to 7 GHz.

At operation 304C, a high-band filtering may be executed. The plurality of different filters 212 may further include the third band filter 212C (e.g., a high-band filter) configured to process the received RF signals in a third frequency range, where the third frequency range may be higher than the second frequency range. In an example, the third frequency range may be between 3.1 GHz to 300 GHz or 7.2 GHz to 300 GHz. The band-specific filtering operation may include determining an input RF signal frequency and directing the input RF signal through one of three concurrent filtering paths based on the frequency range.

At operation 306A, the filtered RF signals from the low-band filtering may be upconverted to a predetermined frequency range (i.e., one of 2.4 GHz, 5 GHz, 6 GHz, or 7 GHz). At operation 306B, the filtered RF signals from the mid-band filtering may be directly converted (if needed) to a predetermined frequency range (i.e., one of 2.4 GHz, 5 GHz, 6 GHz, or 7 GHz). At operation 306C, the filtered RF signals from the high-band filtering may be down-converted to a predetermined frequency range (i.e., one of 2.4 GHz, 5 GHz, 6 GHz, or 7 GHz).

At operation 308, a high-side local oscillator frequency injection may be performed. The local oscillator generator 214 may be configured to generate tunable local oscillator frequencies above a threshold frequency, such as 9.8 GHz. The circuitry 246 may be further configured to determine an input RF signal frequency of the received RF signals from among the plurality of frequency bands of Dc to 300 GHz and then perform the high-side local oscillator frequency injection.

At operation 310, in the mixer stage processing, the circuitry 246 may be configured to execute a frequency shifting operation in one or more frequency conversion stages in which one or more tuned local oscillator frequencies above the threshold frequency may be injected at the circuitry 246 to push image frequencies above the threshold frequency and shift the filtered RF signals to predefined intermediate frequencies. The frequency shifting operation may include either one or multiple frequency conversion stages, where each conversion stage may be configured to translate a received RF signal to a predetermined intermediate frequency through strategic local oscillator injection. The local oscillator frequencies may be adjusted in real-time based on the detected input signal frequency, desired intermediate frequency for processing, required image frequency suppression, and phase noise optimization requirements.

Typically, WLAN chipsets like Wi-Fi® 7 chips may only process certain frequencies (like 2.4 GHz, 5 GHz, 6 or 7 GHz). However, if many other frequencies (up to 300 GHz) are to be monitored then these other frequencies may be converted intelligently so the WLAN chipsets (e.g., the WLAN radio 244 and the WLAN modem 228) may understand them.

In an example, the circuitry 246 may be configured to execute a multi-stage frequency shifting operation, where for signals in different frequency ranges, the following conversions may be implemented. For example, for signals at 100 GHz, a first stage conversion may inject an 85 GHz local oscillator frequency to achieve a difference frequency of 15 GHz (100 GHz-85 GHz=15 GHz) while producing an image frequency at 185 GHz (100 GHz+85 GHz=185 GHz), followed by a second stage employing a 9 GHz local oscillator frequency to convert the 15 GHz signal to a final intermediate frequency of 6 GHz (15 GHz-9 GHz=6 GHz), with the second image at 24 GHz image frequency (15 GHz+9 GHz=24 GHz) experiencing natural attenuation. The final intermediate frequency of 6 GHz may be one of the predefined intermediate frequencies.

In another example, for signals at 50 GHz, the circuitry 246 may employ a first stage conversion using a 41 GHz local oscillator frequency to produce a difference frequency of 9 GHz (50 GHz-41 GHz=9 GHz) with an image at 91 GHz (50 GHz+41 GHz=91 GHz), followed by a second stage using a 4 GHz local oscillator frequency to achieve a final intermediate frequency of 5 GHz (9 GHz-4 GHz=5 GHz) with a second image at 13 GHz (9 GHz+4 GHz=13 GHz). The final intermediate frequency of 5 GHz may be one of the predefined intermediate frequencies.

In yet another example, for processing a 28 GHz signal using a WLAN chipset limitations (which can only process 2.4 GHz, 5 GHz, and 6 GHz), the frequency shifting operation in a single conversion stage may be exemplified as follows. For an input RF signal frequency (FRF) of 28 GHz, the conversion may be executed by injecting a tuned local oscillator frequency (FLO) of 23 GHz (which is above the threshold frequency of 9.8 GHz). The difference frequency (desired or predetermined IF) may be 5 GHz (i.e., 28–23=5 GHz) which matches Wi-Fi® 7 processing capability). The image frequency may be 51 GHz (i.e., sum of 23 GHz+28 GHz=51 GHz (Naturally attenuated)). The frequency shifting operation may maintain FLO+FRF>threshold frequency (9.8 GHz), thereby converting the 28 GHz signal to a 5 GHz intermediate frequency that may be directly processed by the WLAN chipset (e.g., Wi-Fi® 7 chipset), while pushing the image frequency to 51 GHz where it experiences natural attenuation, thus eliminating the need for complex image rejection filtering while enabling efficient processing of the 28 GHz signal through WLAN chipset.

In accordance with an embodiment, the circuitry 246 may be configured to execute a frequency shifting operation for a 300 GHz signal through multiple practical frequency conversion stages, wherein a first conversion stage may employ a frequency divider to create a 50 GHz intermediate signal (300 GHz=6), followed by mixing with a tuned local oscillator frequency of 45 GHz (above threshold frequency of 9.8 GHz) to generate a 5 GHz intermediate frequency (|45 GHz−50 GHz|=5 GHz), while pushing the image frequency to 95 GHz (45 GHz+50 GHz) where natural attenuation occurs. The operation may further comprise a second conversion stage wherein the 5 GHz intermediate frequency may or may not be mixed with a second local oscillator at 11 GHz to produce a final intermediate frequency of 6 GHz (|11 GHz−5 GHz|) suitable for Wi-Fi® 7 processing, while pushing the second image frequency to 16 GHz (11 GHz+5 GHz) where natural attenuation occurs, thereby enabling efficient processing of extremely high frequency signals through practical local oscillator frequencies and frequency division while maintaining all image frequencies above the threshold frequency where natural attenuation occurs, thus achieving effective conversion to Wi-Fi®-compatible frequencies using realizable components. In another example, the frequency divider may not be used and multiple high-side local oscillator frequency injections may be done.

At operation 312, in the intermediate frequency (IF) stage processing, the circuitry 246 may be further configured to convert the filtered RF signals at the predefined intermediate frequencies, for example, a common intermediate frequency or different predefined intermediate frequencies as a result of the operation 310.

At operation 314, WLAN chipset processing may be executed. The circuitry 246 may be further configured to convert the filtered RF signals at the predefined intermediate frequencies in digital form to obtain digitized down-converted signals. The filtered RF signals at the predefined intermediate frequencies may be the down-converted IF signals but still in the analog form at the operation 312, which may then be processed through an Analog-to-Digital Converter (ADC) that may sample and convert the analog IF signals into digital form, thereby obtaining the digitized down-converted signals. The RF band mapper 220 in the RF front-end 208 may be further configured to demultiplex the filtered RF signals at the predefined intermediate frequencies into a plurality of different wireless local area network (WLAN) frequency channels, such as 2.4 GHz, 5 GHz, and 6 GHz and assign a distinct signal processing path to each of the plurality of different WLAN frequency channels. The digitized down-converted signals in the first intermediate frequency band, for example, of 5 GHz and the second intermediate frequency band, for example, in 6 GHz (i.e., the predefined intermediate frequencies) may be concurrently processed based on configuration of the MLO parameters in the wireless communication device 104A. In other words, the digitized down-converted signals are segregated into the 5 GHz and 6 GHz processing paths where band-specific optimizations, such as spectral shaping, power control, and frequency analysis, may be done to enable tailored analysis, such as identifying unique interference sources or interference signals in each band. The spectral shaping may optimize signal characteristics through filtering and waveform adjustments to enhance detection and minimize interference. The power control may dynamically adjust signal strength to improve reception, maintain regulatory compliance, and optimize the signal-to-noise ratio. The frequency analysis may extract spectral features using FFT or other techniques to identify interference patterns, classify signals, and detect anomalies unique to the 5 GHz and 6 GHz bands.

At operation 316, a real time or near real-time spectrum monitoring operation and analysis may be performed. At operation 316A, Fast Fourier Transform (FFT) processing may be performed. In other words, the processor 230 may be configured to execute the sliding window FFT operation on the digitized down-converted signals from each of the first intermediate frequency band and the second intermediate frequency band. The processor 230 may be further configured to maintain a continuous FFT buffer for each of the first intermediate frequency band and the second intermediate frequency band and compute cross-correlation coefficients between FFT outputs of the first intermediate frequency band and the second intermediate frequency band to detect spectrum characteristics. The processor 230 may be further configured to perform enhanced cross-band correlation between the processed digitized down-converted signals from the first intermediate frequency band, for example, of 5 GHz and the second intermediate frequency band, for example, of 6 GHz to identify related signal patterns.

At operation 316B, spectrum analysis may be performed. The processor 230 may be configured to perform a real-time or near real-time spectrum energy detection in each of the first intermediate frequency band and the second intermediate frequency band. The processor 230 may be further configured to identify coordinated transmission patterns based on energy correlations from the real-time or near real-time spectrum energy detection.

At 316C, pattern recognition may be performed. The processor 230 may be configured to execute the trained ANN model 232 to identify recurring signal patterns at each event of the cross-band correlation. The processor 230 may be configured to adjust detection parameters of signal correlation patterns in the cross-band correlation based on successful pattern matches to identify new or evolving signal patterns at one or more subsequent events of the cross-band correlation.

At 316D, signal classification may be performed. The processor 230 may be further configured to classify signals based on the identified recurring signal patterns and the adjusted detection parameters of the signal correlation patterns in the cross-band correlation. The classified signals may comprise one or more of: legitimate signal communications (e.g., from legitimate signal sources 108), potential jamming signals (e.g., from the signal jamming sources 110), frequency hopping transmissions (e.g., from the moving interference sources 114), or unknown or anomalous signals tagged for further analysis (e.g., from the unknown signal sources 112).

In contrast to conventional systems and devices (e.g. conventional spectrum analyzers) requiring dedicated hardware for different frequency bands, embodiments herein advantageously utilize commercial WLAN chipsets (e.g., IEEE 802.11be chipset and modems) with intelligent signal down conversion and signal processing architectures as described to achieve wide frequency range coverage (DC to 100 or 300 GHz) in a cost-effective manner. The disclosed MIMO-MLO integration enables capabilities previously requiring multiple expensive dedicated instruments. For example, the received RF signals captured from air of 0-100+ GHz may be down converted and digitized to desired intermediate frequencies, for example, frequencies like (5 GHz and 6 GHz) capable of being processed firstly in the WLAN chipset, which not only simplifies the signal processing but also reduces the cost effectively without any compromise in spectrum analysis results. For example, there is no need for expensive ADCs to handle high-bandwidth signal capture (e.g., >7 GHz) directly, and complex signal processing hardware due to down conversion to desired intermediate frequencies. The real-time cross-band correlation between different intermediate frequency bands, enabled by MLO parameters, allows detection of related signal patterns across frequency bands-a capability absent in traditional single-band analyzers. This cross-correlation technique provides improved interference rejection and signal characterization.

FIGS. 4A, 4B, and 4C collectively, is a flowchart of a method for enhanced spectrum monitoring across multiple frequency bands, in accordance with an embodiment of the disclosure. FIGS. 4A, 4B, and 4C are explained in conjunction with elements from FIGS. 1, 2, and 3. With reference to 4A, 4B, and 4C, there is shown a flowchart of a method 400 comprising exemplary operations 402 through 438. The method 400 may be implemented in any of the wireless communication devices 104A, 104B, 104C, . . . , 104N.

At 402, radio frequency (RF) signals may be received across a plurality of frequency bands in a range of direct current (DC) to 300 gigahertz (GHz). The RF input 204 may include one or more antenna arrays 206 that may comprise the plurality of dual-polarized antennas 206A configured to capture the RF signals in vertical and horizontal polarizations across the plurality of frequency bands.

At 404, band-specific filtering operation may be applied to the received RF signals across the plurality of frequency bands to obtain filtered RF signals. The plurality of different filters 212 may be configured to apply the band-specific filtering operation to the received RF signals across the plurality of frequency bands to obtain the filtered RF signals. The operation 404 may include one or more sub-operations, such as operations 404A to 404C.

At 404A, the received RF signals may be processed via the first band filter 212A in a first frequency range. At 404B, the received RF signals may be processed via the second band filter 212B in a second frequency range, where the second frequency range may be higher than the first frequency range. At 404C, the received RF signals may be processed via the third band filter 212C in a third frequency range, where the third frequency range may be higher than the second frequency range. In an example, the first frequency range may be 1 hertz (Hz) to 1 GHz, the second frequency range may be 1.1 to 3 GHz, and the third frequency range may be between 3.1 GHz to 300 GHz. In another example, the first frequency range may be 50 MHz to 2.2 GHz, the second frequency range may be 2.4 GHz to 7 GHz, and the third frequency range may be between 7.2 GHz to 300 GHz.

At 406, the input RF signal frequency of the received RF signals may be determined from among the plurality of frequency bands. The circuitry 246 may be further configured to determine an input RF signal frequency of the received RF signals from among the plurality of frequency bands ranging from DC to 300 GHz.

At 408, tunable local oscillator frequencies may be generated above a threshold frequency. The local oscillator generator 214 may be configured to generate one or more tunable local oscillator frequencies above the threshold frequency (e.g., 9.8 GHz). The operation 408 may include one or more sub-operation, such as the operation 408A. At 408A, a specific local oscillator frequency that is higher than the determined input RF signal frequency by a defined offset, may be generated via the local oscillator generator 214.

At 410, a frequency shifting operation may be executed in one or more frequency conversion stages in which one or more tuned local oscillator frequencies above the threshold frequency may be injected at the circuitry 246 to push image frequencies above the threshold frequency and shift the filtered RF signals to predefined intermediate frequencies.

At 412, the filtered RF signals at the predefined intermediate frequencies may be converted into digital form to obtain digitized down-converted signals. One or more ADCs, such as the ADC arrays 226, may be configured to convert the filtered RF signals at the predefined intermediate frequencies into digital form (e.g., for baseband processing) to obtain digitized down-converted signals.

At 414, the filtered RF signals at the predefined intermediate frequencies may be demultiplexed into a plurality of different wireless local area network (WLAN) frequency channels. The RF front-end 208 by use of the RF band mapper 220 may be configured to demultiplex the filtered RF signals at the predefined intermediate frequencies into the plurality of different WLAN frequency channels, such as 2.4 GHz, 5 GHz, and/or 6 GHz.

At 416, a distinct signal processing path may be assigned to each of the plurality of different WLAN frequency channels. The RF front-end 208 by use of the RF band mapper 220 may be configured to assign corresponding distinct signal processing path (e.g., the first WLAN RF chain 222A, the second WLAN RF chain 222B, and the third WLAN RF chain 222C) to each of the plurality of different WLAN frequency channels.

At 418, the digitized down-converted signals in a first intermediate frequency band and a second intermediate frequency band corresponding to the predefined intermediate frequencies may be concurrently processed based on configuration of multi-link operation (MLO) parameters in the wireless communication device 104A.

At 420, a cross-band correlation may be performed between the processed digitized down-converted signals from the first intermediate frequency band and the second intermediate frequency band to identify related signal patterns. The operation 420 may include one or more sub-operations, such as operations 420A to 420C.

At 420A, a sliding window Fast Fourier Transform (FFT) operation may be executed on the digitized down-converted signals from each of the first intermediate frequency band and the second intermediate frequency band. At 420B, a continuous FFT buffer may be maintained for each of the first intermediate frequency band and the second intermediate frequency band. At 420C, cross-correlation coefficients may be computed between FFT outputs of the first intermediate frequency band and the second intermediate frequency band to detect temporal signal patterns.

At 422, a real-time or near real-time spectrum monitoring operation may be performed based on the processed digitized down-converted signals.

At 424, a real-time or near real-time spectrum energy detection may be performed in each of the first intermediate frequency band and the second intermediate frequency band.

At 426, coordinated transmission patterns may be identified based on energy correlations using the spectrum energy detection.

At 428, one or more alerts may be generated when correlated energy patterns match a defined threat criteria.

At 430, a trained ANN model 232 may be executed to identify recurring signal patterns at each event of the cross-band correlation.

At 432, correlation thresholds may be updated based on pattern recognition results from the identified recurring signal patterns at each event of the cross-band correlation.

At 434, detection parameters of signal correlation patterns in the cross-band correlation may be adjusted based on successful pattern matches to identify new or evolving signal patterns at one or more subsequent events of the cross-band correlation as the operational response.

At 436, signals may be classified based on the identified recurring signal patterns and the adjusted detection parameters of the signal correlation patterns in the cross-band correlation. The classified signals may include legitimate signal communications, potential jamming signals, frequency hopping transmissions, or unknown or anomalous signals tagged for further analysis. Alternatively, the detected signals may be classified based on the cross-band correlation, the null steering, and the angle-of-arrival information.

At 438, the wireless communication device 104A may be controlled to trigger an operational response based on the classified signals and the cross-band correlation.

Various embodiments of the disclosure may provide the wireless communication device 104A. The wireless communication device 104A may include the RF input 204 configured to receive RF signals across a plurality of frequency bands in a range of direct current (DC) to 300 gigahertz (GHz). The wireless communication device 104A may further include the RF front-end 208 that may comprise the plurality of different filters 212 configured to apply band-specific filtering operation to the received RF signals across the plurality of frequency bands to obtain filtered RF signals. The wireless communication device 104A may further include the local oscillator generator 214 configured to generate tunable local oscillator frequencies above a threshold frequency. The wireless communication device 104A may further include the circuitry 246 coupled to the plurality of different filters 212 and the local oscillator generator 214, where the circuitry 246 may be configured to execute a frequency shifting operation in one or more frequency conversion stages in which one or more tuned local oscillator frequencies above the threshold frequency are injected at the circuitry 246 (e.g. the mixer 216 of the circuitry 246) to push image frequencies above the threshold frequency and shift the filtered RF signals to predefined intermediate frequencies. The circuitry 246 may be further configured to convert the filtered RF signals at the predefined intermediate frequencies in digital form to obtain digitized down-converted signals. The wireless communication device 104A may further include the processor 230 coupled to the circuitry 246 and configured to concurrently process the digitized down-converted signals in a first intermediate frequency band and a second intermediate frequency band corresponding to the predefined intermediate frequencies, based on configuration of multi-link operation (MLO) parameters in the wireless communication device 104A. The processor 230 may be further configured to perform a real-time or near real-time spectrum monitoring operation based on the processed digitized down-converted signals.

Various embodiments of the disclosure may provide a computer program product for wideband spectrum monitoring, the computer program product comprising a non-transitory computer-readable storage medium having program instructions embodied therewith, the program instructions are executable by a system to cause the system to execute operations, the operations comprising receiving radio frequency (RF) signals across a plurality of frequency bands in a range of direct current (DC) to 300 gigahertz (GHz). The operations may further comprise applying band-specific filtering operation to the received RF signals across the plurality of frequency bands to obtain filtered RF signals. The operations may further comprise generating tunable local oscillator frequencies to above a threshold frequency. The operations may further comprise executing a frequency shifting operation in one or more frequency conversion stages in which one or more tuned frequencies above the threshold frequency are injected to the obtained filtered RF signals to push image frequencies above the threshold frequency and shift the filtered RF signals to predefined intermediate frequencies. The operations may further comprise converting the filtered RF signals at the predefined intermediate frequencies in digital form to obtain digitized down-converted signals. The operations may further comprise concurrently processing the digitized down-converted signals in a first intermediate frequency band and a second intermediate frequency band corresponding to the predefined intermediate frequencies, based on configuration of multi-link operation (MLO) parameters. The operations may further comprise performing a real-time or near real-time spectrum monitoring operation based on the processed digitized down-converted signals.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A wireless communication device, comprising:
   a radio frequency (RF) input configured to receive RF signals across a plurality of frequency bands in a range of direct current (DC) to 300 gigahertz (GHz);
   a RF front-end that comprises:
   a plurality of band filters configured to apply band-specific filtering operation to the received RF signals across the plurality of frequency bands to obtain filtered RF signals;
   a local oscillator generator configured to generate tunable local oscillator frequencies above a threshold frequency;
   a circuitry coupled to the plurality of band filters and the local oscillator generator, wherein the circuitry is configured to:

execute a frequency shifting operation in one or more frequency conversion stages in which one or more tuned local oscillator frequencies above the threshold frequency are injected at the circuitry to push image frequencies above the threshold frequency and shift the filtered RF signals to predefined intermediate frequencies;
   convert the filtered RF signals at the predefined intermediate frequencies in digital form to obtain digitized down-converted signals; and
   a processor coupled to the circuitry and configured to:
   concurrently process the digitized down-converted signals in a first intermediate frequency band and a second intermediate frequency band corresponding to the predefined intermediate frequencies, based on configuration of multi-link operation (MLO) parameters in the wireless communication device; and
   perform a real-time spectrum monitoring operation based on the processed digitized down-converted signals.

2. The wireless communication device according to claim 1, wherein the RF input comprises one or more antenna arrays that comprises a plurality of dual-polarized antennas configured to capture the RF signals in vertical and horizontal polarizations across the plurality of frequency bands.

3. The wireless communication device according to claim 1, wherein the plurality of band filters comprises:
   a first band filter configured to process the received RF signals in a first frequency range;
   a second band filter configured to process the received RF signals in a second frequency range, wherein the second frequency range is higher than the first frequency range; and
   a third band filter configured to process the received RF signals in a third frequency range, wherein the third frequency range is higher than the second frequency range.

4. The wireless communication device according to claim 3, wherein the first frequency range is 1 hertz (Hz) to 1 GHz, the second frequency range is 1.1 to 3 GHz, and the third frequency range is between 3.1 GHz to 300 GHz.

5. The wireless communication device according to claim 1, wherein the first intermediate frequency band is different from the second intermediate frequency band, and wherein each of the predefined intermediate frequencies corresponding to the first intermediate frequency band and the second intermediate frequency band is one of: 2.4 GHz, 5 GHz, 6 GHz, 7 GHz, or other unlicensed or Industrial, scientific, and medical (ISM) frequency band.

6. The wireless communication device according to claim 1, wherein the circuitry is further configured to:
   determine an input RF signal frequency of the received RF signals from among the plurality of frequency bands;
   generate, via the local oscillator generator, a specific local oscillator frequency that is higher than the determined input RF signal frequency by a defined offset; and
   perform a high-side injection based on the specific local oscillator frequency to push the image frequencies above the threshold frequency.

7. The wireless communication device according to claim 1, wherein the RF front-end is further configured to:
   demultiplex the filtered RF signals at the predefined intermediate frequencies into a plurality of different wireless local area network (WLAN) frequency channels; and assign a distinct signal processing path to each of the plurality of different WLAN frequency channels.

8. The wireless communication device according to claim 1, wherein the processor is further configured to perform a cross-band correlation between the processed digitized down-converted signals from the first intermediate frequency band and the second intermediate frequency band.

9. The wireless communication device according to claim 8, wherein, for the cross-band correlation, the processor is further configured to:

execute a sliding window Fast Fourier Transform (FFT) operation on the digitized down-converted signals from each of the first intermediate frequency band and the second intermediate frequency band;

maintain a continuous FFT buffer for each of the first intermediate frequency band and the second intermediate frequency band; and compute cross-correlation coefficients between FFT outputs of the first intermediate frequency band and the second intermediate frequency band to detect spectrum characteristics.

10. The wireless communication device according to claim 9, wherein the processor is further configured to execute a trained artificial neural network model to identify recurring signal patterns at each event of the cross-band correlation.

11. The wireless communication device according to claim 10, wherein the processor is further configured to update correlation thresholds based on pattern recognition results from the identified recurring signal patterns at each event of the cross-band correlation.

12. The wireless communication device according to claim 11, wherein the processor is further configured to adjust detection parameters of signal correlation patterns in the cross-band correlation based on successful pattern matches to identify new or evolving signal patterns at one or more subsequent events of the cross-band correlation.

13. The wireless communication device according to claim 12, wherein the processor is further configured to classify signals based on the identified recurring signal patterns and the adjusted detection parameters of the signal correlation patterns in the cross-band correlation, wherein the classified signals comprise one or more of: legitimate signal communications, potential jamming signals, frequency hopping transmissions, or unknown or anomalous signals tagged for further analysis.

14. The wireless communication device according to claim 1, wherein the processor is further configured to perform a real-time spectrum energy detection in each of the first intermediate frequency band and the second intermediate frequency band.

15. The wireless communication device according to claim 14, wherein the processor is further configured to identify coordinated transmission patterns based on energy correlations from the real-time spectrum energy detection.

16. The wireless communication device according to claim 15, wherein the processor is further configured to generate one or more alerts when the identified coordinated transmission patterns match a defined threat criteria.

17. A method for wideband spectrum monitoring, comprising:

in a wireless communication device:

receiving radio frequency (RF) signals across a plurality of frequency bands in a range of direct current (DC) to 300 gigahertz (GHz);

applying band-specific filtering operation to the received RF signals across the plurality of frequency bands to obtain filtered RF signals;

generating tunable local oscillator frequencies to above a threshold frequency;

executing a frequency shifting operation in one or more frequency conversion stages in which one or more tuned local oscillator frequencies above the threshold frequency are injected to the obtained filtered RF signals to push image frequencies above the threshold frequency and shift the filtered RF signals to predefined intermediate frequencies;

converting the filtered RF signals at the predefined intermediate frequencies in digital form to obtain digitized down-converted signals;

concurrently processing the digitized down-converted signals in a first intermediate frequency band and a second intermediate frequency band corresponding to the predefined intermediate frequencies, based on configuration of multi-link operation (MLO) parameters in the wireless communication device; and performing a real-time spectrum monitoring operation based on the processed digitized down-converted signals.

18. The method according to claim 17, further comprising:

process, via a first band filter, the received RF signals in a first frequency range;

process, via a second band filter, the received RF signals in a second frequency range, wherein the second frequency range is higher than the first frequency range; and process, via a third band filter, the received RF signals in a third frequency range, wherein the third frequency range is higher than the second frequency range.

19. The method according to claim 18, wherein the first frequency range is 1 hertz (Hz) to 1 GHz, the second frequency range is 1.1 to 3 GHz, and the third frequency range is between 3.1 GHz to 300 GHz.

20. A computer program product for wideband spectrum monitoring, the computer program product comprising a non-transitory computer-readable storage medium having program instructions embodied therewith, the program instructions are executable by a system to cause the system to execute operations, the operations comprising:

receiving radio frequency (RF) signals across a plurality of frequency bands in a range of direct current (DC) to 300 gigahertz (GHz);

applying band-specific filtering operation to the received RF signals across the plurality of frequency bands to obtain filtered RF signals;

generating tunable local oscillator frequencies to above a threshold frequency;

executing a frequency shifting operation in one or more frequency conversion stages in which one or more tuned frequencies above the threshold frequency are injected to the obtained filtered RF signals to push image frequencies above the threshold frequency and shift the filtered RF signals to predefined intermediate frequencies;

converting the filtered RF signals at the predefined intermediate frequencies in digital form to obtain digitized down-converted signals;

concurrently processing the digitized down-converted signals in a first intermediate frequency band and a second intermediate frequency band corresponding to the predefined intermediate frequencies, based on configuration of multi-link operation (MLO) parameters; and performing a real-time spectrum monitoring operation based on the processed digitized down-converted signals.

* * * * *